United States Patent
Salsbury et al.

(10) Patent No.: US 11,686,480 B2
(45) Date of Patent: Jun. 27, 2023

(54) NOISE-ADAPTIVE EXTREMUM-SEEKING CONTROLLER

(71) Applicant: Johnson Controls Technology Company, Auburn Hills, MI (US)

(72) Inventors: Timothy I. Salsbury, Mequon, WI (US); Carlos Felipe Alcala Perez, Milwaukee, WI (US); John M. House, Saint-Leonard (CA)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 647 days.

(21) Appl. No.: 16/740,020

(22) Filed: Jan. 10, 2020

(65) Prior Publication Data

US 2020/0149757 A1 May 14, 2020

Related U.S. Application Data

(63) Continuation-in-part of application No. 16/438,854, filed on Jun. 12, 2019, now Pat. No. 10,845,070,
(Continued)

(51) Int. Cl.
*F24F 5/00* (2006.01)
*F24F 11/30* (2018.01)
(Continued)

(52) U.S. Cl.
CPC ............ *F24F 5/0035* (2013.01); *F24F 11/30* (2018.01); *F24F 11/62* (2018.01); *F24F 11/77* (2018.01);
(Continued)

(58) Field of Classification Search
CPC .......... F24F 5/0035; F24F 11/30; F24F 11/62; F24F 11/77; F24F 11/83; F24F 11/54;
(Continued)

(56) References Cited

U.S. PATENT DOCUMENTS 5,357,421 A * 10/1994 Tautz .................... B21B 37/54
706/900
7,827,813 B2 11/2010 Seem
(Continued)

FOREIGN PATENT DOCUMENTS

CN 101861552 10/2010
CN 204880453 12/2015
(Continued)

OTHER PUBLICATIONS

Saurav Kumar, Extremum Seeking Control for Multi-Objective Optimization Problems, Dec. 12, 2016-Dec. 14, 2016, IEEE, 55th conference on Decision and Control (CDC) (Year: 2016).*
(Continued)

*Primary Examiner* — Rocio Del Mar Perez-Velez
*Assistant Examiner* — Christopher W Carter
(74) *Attorney, Agent, or Firm* — Foley & Lardner LLP

(57) ABSTRACT

A method for performing extremum-seeking control of a plant includes determining multiple values of a correlation coefficient that relates a control input provided as an input to the plant to a performance variable that characterizes a performance of the plant in response to the control input. The performance variable includes a noise-free portion and an amount of noise. The method includes determining an adjusted correlation coefficient by scaling a first value of the correlation coefficient selected from the multiple values relative to a second value of the correlation coefficient selected from the multiple values. The adjusted correlation coefficient relates the noise-free portion of the performance variable to the control input. The method includes using the adjusted correlation coefficient to modulate the control input provided as an input to the plant.

17 Claims, 13 Drawing Sheets

Related U.S. Application Data which is a continuation of application No. 15/080,435, filed on Mar. 24, 2016, now Pat. No. 10,352,576.

(60) Provisional application No. 62/798,914, filed on Jan. 30, 2019, provisional application No. 62/296,713, filed on Feb. 18, 2016.

(51) Int. Cl.

| | |
|---|---|
| *F24F 11/62* | (2018.01) |
| *F24F 11/77* | (2018.01) |
| F24F 11/83 | (2018.01) |
| *F24F 11/85* | (2018.01) |
| *F24F 140/60* | (2018.01) |
| *F24F 11/63* | (2018.01) |
| *F24F 11/54* | (2018.01) |

(52) U.S. Cl.
CPC .............. *F24F 11/83* (2018.01); *F24F 11/54* (2018.01); *F24F 11/63* (2018.01); *F24F 11/85* (2018.01); *F24F 2140/60* (2018.01)

(58) Field of Classification Search
CPC ........ F24F 11/63; F24F 11/85; F24F 2140/60; F24F 3/001; Y02B 30/70; G05B 13/024
See application file for complete search history.

(56) References Cited

U.S. PATENT DOCUMENTS

| | | | |
|---|---|---|---|
| 8,027,742 B2 | 9/2011 | Seem et al. | |
| 8,200,344 B2 | 6/2012 | Li et al. | |
| 8,200,345 B2 | 6/2012 | Li et al. | |
| 8,473,080 B2 | 6/2013 | Seem et al. | |
| 8,478,433 B2 | 7/2013 | Seem et al. | |
| 8,825,185 B2 | 9/2014 | Salsbury | |
| 8,903,554 B2 | 12/2014 | Stagner | |
| 9,348,325 B2 | 5/2016 | Salsbury et al. | |
| 9,835,349 B2 | 12/2017 | Salsbury et al. | |
| 10,197,977 B2 | 2/2019 | Salsbury et al. | |
| 10,209,684 B2 | 2/2019 | Salsbury et al. | |
| 10,352,576 B2 | 7/2019 | Salsbury et al. | |
| 2009/0083583 A1 | 3/2009 | Seem et al. | |
| 2011/0276180 A1 | 11/2011 | Seem | |
| 2012/0217818 A1 | 8/2012 | Yerazunis et al. | |
| 2015/0277444 A1* | 10/2015 | Burns ................. | G05B 15/02 |
| | | | 700/282 |
| 2016/0061693 A1 | 3/2016 | Salsbury et al. | |
| 2016/0084514 A1 | 3/2016 | Salsbury et al. | |
| 2016/0098020 A1 | 4/2016 | Salsbury et al. | |
| 2016/0132027 A1 | 5/2016 | Li et al. | |
| 2016/0259351 A1 | 9/2016 | Barrett et al. | |

FOREIGN PATENT DOCUMENTS

| | | |
|---|---|---|
| CN | 105805887 | 7/2016 |
| JP | 6462021 | 8/2017 |
| WO | WO-2015/015876 A1 | 2/2015 |
| WO | WO-2015/146531 A1 | 10/2015 |

OTHER PUBLICATIONS

U.S. Appl. No. 14/975,527, filed Dec. 18, 2015, Johnson Controls Technology Company.
2012-2013 Report on Advances in Control Science and Engineering, China Science and Technology Association, China Science and Technology Press, Apr. 30, 2014, pp. 43-44.
Astrom. "Optimal Control of Markov Decision Processes with Incomplete State Estimation," J. Math. Anal. Appl., 1965, 10, pp. 174-205.
Bittanti et al., Adaptive Control of Linear Time Invariant Systems: The "Bet on the Best" Principle, Communications in Information and Systems, 2006, 6.4, pp. 299-320.
Burns, "Extremum Seeking Control for Energy Optimization of Vapor Compression Systems," Intl Refrigeration and Air Conditioning Conference, Purdue e-Pubs, Jul. 2012, pp. 1-7.
Chen et al., "Control-oriented System Identification: an H1 Approach," Wiley-Interscience, 2000, 19, Chapters 3 & 8, 38 pages.
Feng et al., "Model Predictive Control of Radiant Slab Systems with Evaporative Cooling Sources," Energy and Buildings, 2015, 87, pp. 199-210.
George et al., "Time Series Analysis: Forecasting and Control," Fifth Edition, John Wiley & Sons, 2016, Chapters 4-7 and 13-15, 183 pages.
Golden, "Adaptive Extremum Control Using Approximate Process Models," AIChE Journal, Jul. 1989, 35.7, pp. 1157-1169.
Hardt et al., "Gradient Descent Learns Linear Dynamical Systems," Journal of Machine Learning Research, 2018, 19, pp. 1-44.
Helmicki et al. "Control Oriented System Identification: a Worstcase/deterministic Approach in H1," IEEE Transactions on Automatic Control, 1991, 36.10, pp. 1163-1176.
Hunnekens, et al., A dither-free extremum-seeking control approach using 1st-order least-squares fits for gradient estimation, Proceedings of the 53rd IEEE Conference on Decision and Control, Dec. 15-17, 2014, 6 pages.
Kelman et al., "Bilinear Model Predictive Control of a HVAC System Using Sequential Quadratic Programming," Proceedings of the IFAC World Congress, Sep. 2, 2011, 6 pages.
Kingma et al., "Adam: A Method for Stochastic Optimization," International Conference on Learning Representations (ICLR), 2015, 15 pages.
Kipkup et al., "An Introduction to Uncertainty in Measurement," Xi'an Jiaotong University Press, Jul. 31, 2011, pp. 66-68.
Ljung et al., "Theory and Practice of Recursive Identification," vol. 5. JSTOR, 1983, Chapters 2, 3 & 7, 80 pages.
Ljung, editor. "System Identification: Theory for the User," 2nd Edition, Prentice Hall, Upper Saddle River, New Jersey, 1999, Chapters 5 and 7, 40 pages.
Nevena et al., "Data center cooling using model-predictive control," 32nd Conference on Neural Information Processing Systems, 2018, 10 pages.
Office Action for Japanese Application No. 2017-192695 dated Dec. 4, 2018, 10 pages with English language translation.
Office Action for Japanese Patent Application No. 2017-023864 dated Feb. 6, 2018, 6 pages with English language translation.
Office Action on CN 201710075918.6, dated Apr. 10, 2020, 46 pages with English language translation.
Office Action on CN 201710925693.9, dated May 21, 2020, 7 pages.
Office Action on JP 2018-242617, dated Jan. 21, 2020, 8 pages with English language translation.
Liu, Introduction to Extremum Seeking, 2012, Springer-Verlag, London, Chapter 2, pp. 11-20.
Tyagi et al., "An Extremum Seeking Algorithm for Determining the Set Point Temperature for Condensed Water in a Cooling Tower," 2006 American Control Conference, Jun. 14-16, 2006, pp. 1127-1131.
Walsh, "On the Application of Multi-Parameter Extremum Seeking Control," Proceedings of the American Control Conference, Jun. 2000, pp. 411-415.
Wikipedia, Pearson product-moment correlation coefficient, Oct. 20, 2015 via Wayback Machine, Wikipedia, pp. 1-16 (Year: 2015).
Yudong et al., "Model Predictive Control for the Operation of Building Cooling Systems," IEEE Transactions on Control Systems Technology, May 2012, 20.3, pp. 796-803.
Yudong et al., "Predictive Control for Energy Efficient Buildings with Thermal Storage: Modeling, Stimulation, and Experiments." IEEE Control Systems, Feb. 2012, 32.1, pp. 44-64.
Zijun et al., "Statistics," Northeastern University Press, Jun. 20, 2010, pp. 109-110.
Kirkup et al., "An Introduction to Uncertainty in Measurement," Xi'an Jiaotong University Press, Jul. 31, 2011, pp. 66-68, 41 pages with original English language version.

* cited by examiner

NOISE-ADAPTIVE EXTREMUM-SEEKING CONTROLLER

CROSS-REFERENCE TO RELATED PATENT APPLICATIONS

This application is a continuation-in-part of U.S. patent application Ser. No. 16/438,854 filed Jun. 12, 2019, which is a continuation of U.S. patent application Ser. No. 15/080,435 filed Mar. 24, 2016, now U.S. Pat. No. 10,352,576 granted Jul. 16, 2019, which claims the benefit of and priority to U.S. Provisional Patent Application No. 62/296,713 filed Feb. 18, 2016, the entire disclosures of which are incorporated by reference herein. This application also claims the benefit of and priority to U.S. Provisional Patent Application No. 62/798,914 filed Jan. 30, 2019, incorporated herein by reference in its entirety.

BACKGROUND

The present disclosure relates generally to an extremum-seeking control (ESC) system. ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. Optimization of system performance can be obtained by driving the gradient towards zero by using a negative feedback loop in the closed-loop system. ESC is a non-model based control strategy, meaning that a model for the controlled system is not necessary for ESC to optimize the system.

One of the drawbacks of using a gradient descent is that it requires tuning of the ESC based on the plant. What is needed is an ESC system which can operate without requiring tuning, and can operate despite noise which may be present in performance variable signals.

SUMMARY

One implementation of the present disclosure is a method for performing extremum-seeking control of a plant, according to some embodiments. In some embodiments, the method includes determining multiple values of a correlation coefficient that relates a control input provided as an input to the plant to a performance variable that characterizes a performance of the plant in response to the control input. In some embodiments, the performance variable includes a noise-free portion and an amount of noise. In some embodiments, the method includes determining an adjusted correlation coefficient by scaling a first value of the correlation coefficient selected from the multiple values relative to a second value of the correlation coefficient selected from the multiple values. In some embodiments, the adjusted correlation coefficient relates the noise-free portion of the performance variable to the control input. In some embodiments, the method includes using the adjusted correlation coefficient to modulate the control input provided as an input to the plant.

In some embodiments, the first value of the correlation coefficient is determined based on a covariance of the control input and the performance variable, a variance of the control input, and a variance of the performance variable.

In some embodiments, the second value of the correlation coefficient is determined based on a first filtered value of multiple estimated values of the correlation coefficient and a forgetting factor.

In some embodiments, the method further includes calculating the forgetting factor based on a dominant time constant of the plant.

In some embodiments, the method further includes scaling the adjusted correlation coefficient to dampen a convergence rate of the control input toward an optimum value as the correlation coefficient approaches zero.

In some embodiments, the amount of noise in the performance variable causes the first value of the correlation coefficient to underrepresent a true correlation between the performance variable and the control input. In some embodiments, the adjusted correlation coefficient reduces an impact of the amount of noise in the performance variable and more accurately represents the true correlation relative to the first value of the correlation coefficient.

In some embodiments, using the adjusted correlation coefficient to modulate the control input includes determining a new value of the control input based on a previous value of the control input, the adjusted correlation coefficient, and a controller gain value.

In some embodiments, the method further includes selecting an extremum of the multiple values of the correlation coefficient as the second value of the correlation coefficient.

In some embodiments, the method further includes adjusting the second value of the correlation coefficient by causing the second value of the correlation coefficient to decay toward zero over time.

In some embodiments, the correlation coefficient is at least one of a gradient of the performance variable with respect to the control input or a normalized indication of the gradient.

Another implementation of the present disclosure is an extremum-seeking controller including a processing circuit. In some embodiments, the processing circuit is configured to determine multiple values of a gradient that relates a control input provided as an input to a plant to a performance variable that characterizes a performance of the plant in response to the control input. In some embodiments, the performance variable includes a noise-free portion and an amount of noise. In some embodiments, the processing circuit is further configured to determine an adjusted gradient by scaling a first value of the gradient selected from the multiple values relative to a second value of the gradient selected from the multiple values. In some embodiments, the adjusted gradient relates the noise-free portion of the performance variable to the control input. In some embodiments, the processing circuit is configured to use the adjusted gradient to modulate the control input provided as an input to the plant.

In some embodiments, the processing circuit is configured to determine the first value of the gradient based on a covariance of the control input and the performance variable, a variable of the control input, and a variance of the performance variable.

In some embodiments, the second value of the gradient is determined based on a first filtered value of the multiple values of the gradient and a forgetting factor.

In some embodiments, the processing circuit is further configured to calculate the forgetting factor based on a dominant time constant of the plant.

In some embodiments, the processing circuit is further configured to scale the adjusted gradient to dampen a convergence rate of the control input toward an optimum value as the gradient approaches zero.

In some embodiments, the processing circuit is further configured to adjust the second value of the gradient by causing the second value of the gradient to decay toward zero over time.

In some embodiments, the processing circuit is configured to select an extremum of the multiple values of the gradient as the second value of the gradient.

Another implementation of the present disclosure is a controller including a processing circuit. In some embodiments, the processing circuit is configured to determine multiple values of a correlation coefficient that relates a control input provided as an input to a plant to a performance variable that characterizes a performance of the plant in response to the control input. In some embodiments, the performance variable includes a noise-free portion and an amount of noise. In some embodiments, the processing circuit is configured to determine an adjusted correlation coefficient by scaling a first value of the correlation coefficient selected from the multiple values relative to a second value of the correlation coefficient selected from the multiple values. In some embodiments, the adjusted correlation coefficient relates the noise-free portion of the performance variable to the control input. In some embodiments, the processing circuit is configured to use the adjusted correlation coefficient to modulate the control input provided as an input to the plant.

In some embodiments, the first value of the correlation coefficient is a maximum value of the multiple values of the correlation coefficient that decays over time.

In some embodiments, the multiple values of the correlation coefficient are filtered values of the correlation coefficient.

DETAILED DESCRIPTION

Overview

Figure 1:
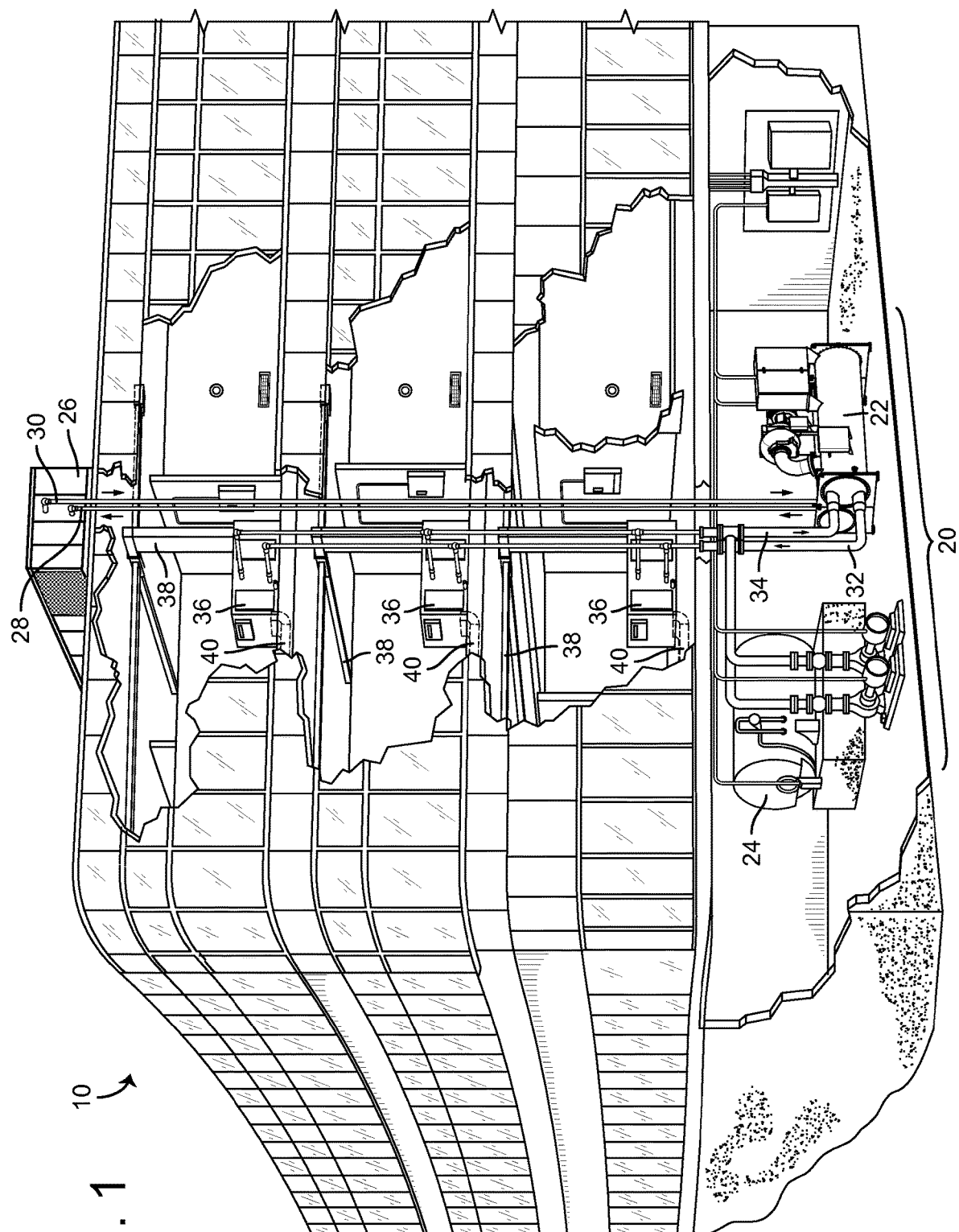
FIG. 1 is a drawing of a building in which an extremum-seeking control system can be implemented, according to some embodiments.

Referring generally to the FIGURES, various extremum-seeking control (ESC) systems and methods are shown, according to some embodiments. In general, ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure.

Optimization of system performance can be obtained by driving the gradient towards zero by using a feedback loop in the closed-loop system. ESC is a non-model based control strategy, meaning that a model for the controlled system is not necessary for ESC to optimize the system. Various implementations of ESC are described in detail in U.S. Pat. Nos. 8,473,080, 7,827,813, 8,027,742, 8,200,345, 8,200,344, U.S. patent application Ser. No. 14/495,773, U.S. patent application Ser. No. 14/538,700, U.S. patent application Ser. No. 14/975,527, and U.S. patent application Ser. No. 14/961,747. Each of these patents and patent applications is incorporated by reference herein.

In some embodiments, an extremum-seeking controller uses a stochastic excitation signal q to perturb a control input u provided to a plant. The controller can include a stochastic signal generator configured to generate a stochastic signal. The stochastic signal can be a random signal (e.g., a random walk signal, a white noise signal, etc.), a non-periodic signal, an unpredictable signal, a disturbance signal, or any other type of non-deterministic or non-repeating signal. In some embodiments, the stochastic signal has a non-zero mean. The stochastic signal can be integrated to generate the excitation signal q.

The stochastic excitation signal q can provide variation in the control input u sufficient to estimate the gradient of the plant output (i.e., a performance variable y) with respect to the control input u. The stochastic excitation signal q has several advantages over a traditional periodic dither signal v. For example, the stochastic excitation signal q is less perceptible than the traditional periodic dither signal v. As such, the effects of the stochastic excitation signal q on the control input u are less noticeable than the periodic oscillations caused by the traditional periodic dither signal v. Another advantage of the stochastic excitation signal q is that tuning the controller is simpler because the dither frequency $\omega_v$ is no longer a required parameter. Accordingly, the controller does not need to know or estimate the natural frequency of the plant when generating the stochastic excitation signal q.

In some embodiments, the extremum-seeking controller uses a recursive estimation technique to estimate the gradient of the performance variable y with respect to the control input u. For example, the controller can use a recursive least-squares (RLS) estimation technique to generate an estimate of the gradient $$\frac{dy}{du}.$$

In some embodiments, the controller uses exponential forgetting as part of the RLS estimation technique. For example, the controller can be configured to calculate exponentially-weighted moving averages (EWMAs) of the performance variable y, the control input u, and/or other variables used in the recursive estimation technique. Exponential forgetting reduces the required amount of data storage (relative to batch processing) and allows the controller to remain more sensitive to recent data and thus more responsive to a shifting optimal point.

In some embodiments, the extremum-seeking controller estimates a normalized correlation coefficient $\rho$ relating the performance variable y to the control input u. The correlation coefficient $\rho$ can be related to the performance gradient $$\frac{dy}{du} \left( \text{e.g., proportional to } \frac{dy}{du} \right)$$

but scaled based on the range of the performance variable y. For example, the correlation coefficient $\rho$ can be a normalized measure of the performance gradient $$\frac{dy}{du}$$

scaled to the range $-1 \leq \rho \leq 1$. The normalized correlation coefficient $\rho$ can be estimated based on the covariance between the performance variable y and the control input u, the variance of the performance variable y, and the variance of the control input u. In some embodiments, the normalized correlation coefficient $\rho$ can be estimated using a recursive estimation process.

The correlation coefficient $\rho$ can be used by the feedback controller instead of the performance gradient $$\frac{dy}{du}.$$

For example, the feedback controller can adjust the DC value w of the control input u to drive the correlation coefficient $\rho$ to zero. One advantage of using the correlation coefficient $\rho$ in place of the performance gradient $$\frac{dy}{du}$$

is that the tuning parameters used by the feedback controller can be a general set of tuning parameters which do not need to be customized or adjusted based on the scale of the performance variable y. This advantage eliminates the need to perform control-loop-specific tuning for the feedback controller and allows the feedback controller to use a general set of tuning parameters that are applicable across many different control loops and/or plants. Additional features and advantages of the extremum-seeking controller are described in greater detail below.

The correlation coefficient $\rho$ can be adjusted to account for noise in a signal associated with the performance variable $\rho$. For example, the correlation coefficient $\rho$ can be adjusted, scaled, filtered, etc., to determine an adjusted correlation coefficient $\rho$ which accounts for signal noise. An extremum-seeking controller can be configured to determine the adjusted correlation coefficient $\rho$ which accounts for signal noise. The extremum-seeking controller is also configured to dampen a convergence rate of ESC by adjusting the correlation coefficient ρ. Advantageously, the extremum-seeking controller can account for noise in various signals such as signal associated with the performance variable y, and does not require tuning.

Building and HVAC System

Figure 2:
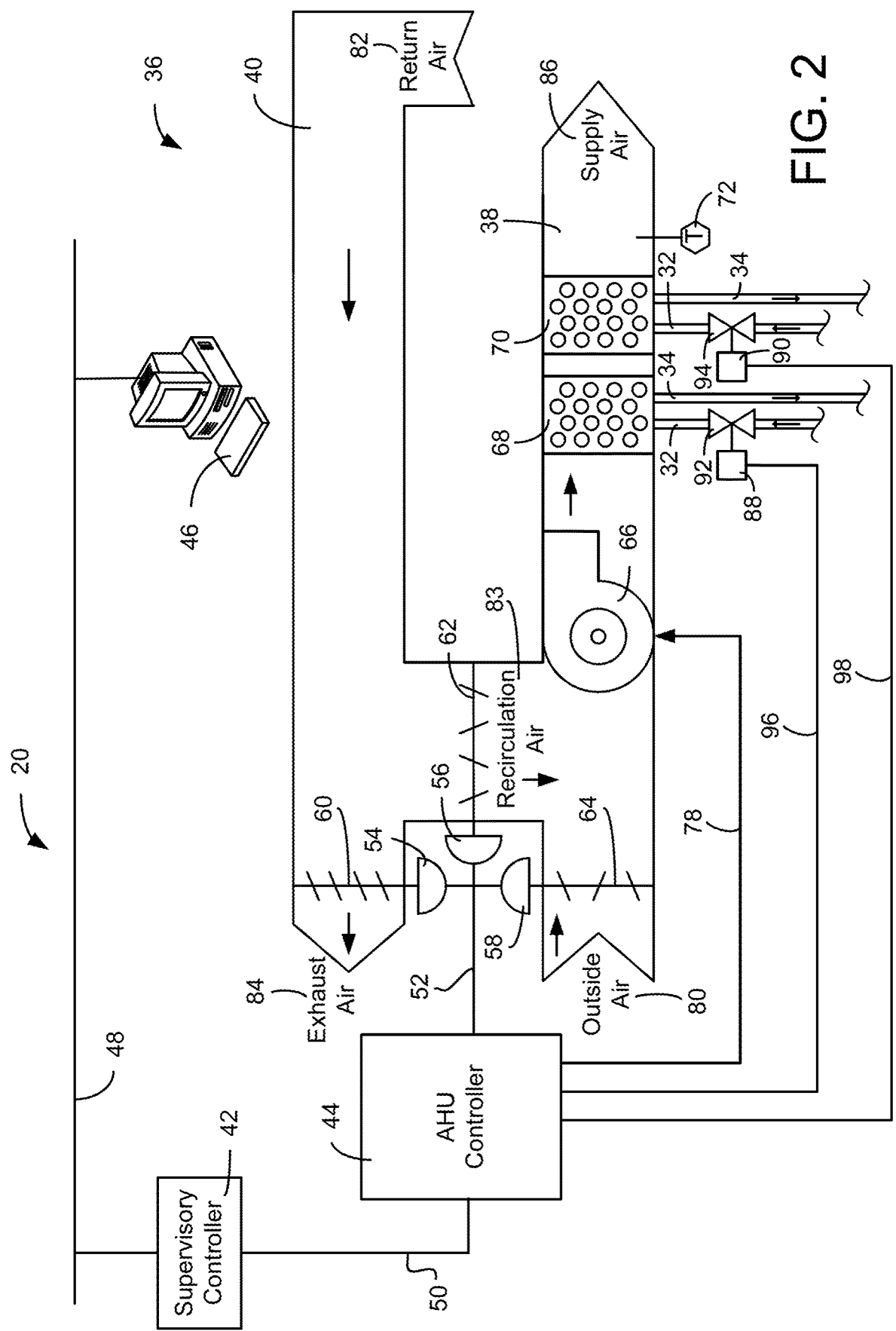
FIG. 2 is a block diagram of a building HVAC system in which an extremum-seeking control system can be implemented, according to some embodiments.

Referring now to FIGS. 1-2, a building 10 and HVAC system 20 in which an extremum-seeking control system can be implemented are shown, according to some embodiments. Although the ESC systems and methods of the present disclosure are described primarily in the context of a building HVAC system, it should be understood that ESC is generally applicable to any type of control system that optimizes or regulates a variable of interest. For example, the ESC systems and methods of the present disclosure can be used to optimize an amount of energy produced by various types of energy producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, refrigeration systems, etc.).

In various implementations, ESC can be used in any type of controller that functions to achieve a setpoint for a variable of interest (e.g., by minimizing a difference between a measured or calculated input and a setpoint) and/or optimize a variable of interest (e.g., maximize or minimize an output variable). It is contemplated that ESC can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.). All such implementations should be considered within the scope of the present disclosure.

Referring particularly to FIG. 1, a perspective view of building 10 is shown. Building 10 is served by HVAC system 20. HVAC system 20 is shown to include a chiller 22, a boiler 24, a rooftop cooling unit 26, and a plurality of air-handling units (AHUs) 36. HVAC system 20 uses a fluid circulation system to provide heating and/or cooling for building 10. The circulated fluid can be cooled in chiller 22 or heated in boiler 24, depending on whether cooling or heating is required. Boiler 24 may add heat to the circulated fluid by burning a combustible material (e.g., natural gas). Chiller 22 may place the circulated fluid in a heat exchange relationship with another fluid (e.g., a refrigerant) in a heat exchanger (e.g., an evaporator). The refrigerant removes heat from the circulated fluid during an evaporation process, thereby cooling the circulated fluid.

The circulated fluid from chiller 22 or boiler 24 can be transported to AHUs 36 via piping 32. AHUs 36 may place the circulated fluid in a heat exchange relationship with an airflow passing through AHUs 36. For example, the airflow can be passed over piping in fan coil units or other air conditioning terminal units through which the circulated fluid flows. AHUs 36 may transfer heat between the airflow and the circulated fluid to provide heating or cooling for the airflow. The heated or cooled air can be delivered to building 10 via an air distribution system including air supply ducts 38 and may return to AHUs 36 via air return ducts 40. In FIG. 1, HVAC system 20 is shown to include a separate AHU 36 on each floor of building 10. In other embodiments, a single AHU (e.g., a rooftop AHU) may supply air for multiple floors or zones. The circulated fluid from AHUs 36 may return to chiller 22 or boiler 24 via piping 34.

In some embodiments, the refrigerant in chiller 22 is vaporized upon absorbing heat from the circulated fluid. The vapor refrigerant can be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant can be discharged into a condenser within chiller 22. In some embodiments, water (or another chilled fluid) flows through tubes in the condenser of chiller 22 to absorb heat from the refrigerant vapor, thereby causing the refrigerant to condense. The water flowing through tubes in the condenser can be pumped from chiller 22 to a rooftop cooling unit 26 via piping 28. Cooling unit 26 may use fan driven cooling or fan driven evaporation to remove heat from the water. The cooled water in rooftop unit 26 can be delivered back to chiller 22 via piping 30 and the cycle repeats.

Referring now to FIG. 2, a block diagram illustrating a portion of HVAC system 20 in greater detail is shown, according to some embodiments. In FIG. 2, AHU 36 is shown as an economizer type air handling unit. Economizer type air handling units vary the amount of outside air and return air used by the air handling unit for heating or cooling. For example, AHU 36 may receive return air 82 from building 10 via return air duct 40 and may deliver supply air 86 to building 10 via supply air duct 38. AHU 36 can be configured to operate exhaust air damper 60, mixing damper 62, and outside air damper 64 to control an amount of outside air 80 and return air 82 that combine to form supply air 86. Any return air 82 that does not pass through mixing damper 62 can be exhausted from AHU 36 through exhaust damper 60 as exhaust air 84.

Each of dampers 60-64 can be operated by an actuator. As shown in FIG. 2, exhaust air damper 60 is operated by actuator 54, mixing damper 62 is operated by actuator 56, and outside air damper 64 is operated by actuator 58. Actuators 54-58 may communicate with an AHU controller 44 via a communications link 52. AHU controller 44 can be an economizer controller configured to use one or more control algorithms (e.g., state-based algorithms, ESC algorithms, PID control algorithms, model predictive control algorithms, etc.) to control actuators 54-58. Examples of ESC methods that can be used by AHU controller 44 are described in greater detail with reference to FIGS. 8-9.

Actuators 54-58 may receive control signals from AHU controller 44 and may provide feedback signals to AHU controller 44. Feedback signals may include, for example, an indication of a current actuator or damper position, an amount of torque or force exerted by the actuator, diagnostic information (e.g., results of diagnostic tests performed by actuators 54-58), status information, commissioning information, configuration settings, calibration data, and/or other types of information or data that can be collected, stored, or used by actuators 54-58.

Still referring to FIG. 2, AHU 36 is shown to include a cooling coil 68, a heating coil 70, and a fan 66. In some embodiments, cooling coil 68, heating coil 70, and fan 66 are positioned within supply air duct 38. Fan 66 can be configured to force supply air 86 through cooling coil 68 and/or heating coil 70. AHU controller 44 may communicate with fan 66 via communications link 78 to control a flow rate of supply air 86. Cooling coil 68 may receive a chilled fluid from chiller 22 via piping 32 and may return the chilled fluid to chiller 22 via piping 34. Valve 92 can be positioned along piping 32 or piping 34 to control an amount of the chilled fluid provided to cooling coil 68. Heating coil 70 may receive a heated fluid from boiler 24 via piping 32 and may return the heated fluid to boiler 24 via piping 34. Valve 94 can be positioned along piping 32 or piping 34 to control an amount of the heated fluid provided to heating coil 70.

Each of valves 92-94 can be controlled by an actuator. As shown in FIG. 2, valve 92 is controlled by actuator 88 and valve 94 is controlled by actuator 90. Actuators 88-90 may communicate with AHU controller 44 via communications links 96-98. Actuators 88-90 may receive control signals from AHU controller 44 and may provide feedback signals to controller 44. In some embodiments, AHU controller 44 receives a measurement of the supply air temperature from a temperature sensor 72 positioned in supply air duct 38 (e.g., downstream of cooling coil 68 and heating coil 70). However, temperature sensor 72 is not required and may not be included in some embodiments.

AHU controller 44 may operate valves 92-94 via actuators 88-90 to modulate an amount of heating or cooling provided to supply air 86 (e.g., to achieve a setpoint temperature for supply air 86 or to maintain the temperature of supply air 86 within a setpoint temperature range). The positions of valves 92-94 affect the amount of cooling or heating provided to supply air 86 by cooling coil 68 or heating coil 70 and may correlate with the amount of energy consumed to achieve a desired supply air temperature. In various embodiments, valves 92-94 can be operated by AHU controller 44 or a separate controller for HVAC system 20.

AHU controller 44 may monitor the positions of valves 92-94 via communications links 96-98. AHU controller 44 may use the positions of valves 92-94 as the variable to be optimized using an ESC control technique. AHU controller 44 may determine and/or set the positions of dampers 60-64 to achieve an optimal or target position for valves 92-94. The optimal or target position for valves 92-94 can be the position that corresponds to the minimum amount of mechanical heating or cooling used by HVAC system 20 to achieve a setpoint supply air temperature (e.g., minimum fluid flow through valves 92-94).

Still referring to FIG. 2, HVAC system 20 is shown to include a supervisory controller 42 and a client device 46. Supervisory controller 42 may include one or more computer systems (e.g., servers, BAS controllers, etc.) that serve as enterprise level controllers, application or data servers, head nodes, master controllers, or field controllers for HVAC system 20. Supervisory controller 42 may communicate with multiple downstream building systems or subsystems (e.g., an HVAC system, a security system, etc.) via a communications link 50 according to like or disparate protocols (e.g., LON, BACnet, etc.).

In some embodiments, AHU controller 44 receives information (e.g., commands, setpoints, operating boundaries, etc.) from supervisory controller 42. For example, supervisory controller 42 may provide AHU controller 44 with a high fan speed limit and a low fan speed limit. A low limit may avoid frequent component and power taxing fan start-ups while a high limit may avoid operation near the mechanical or thermal limits of the fan system. In various embodiments, AHU controller 44 and supervisory controller 42 can be separate (as shown in FIG. 2) or integrated. In an integrated implementation, AHU controller 44 can be a software module configured for execution by a processor of supervisory controller 42.

Client device 46 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 46 can be a computer workstation, a client terminal, a remote or local interface, or any other type of user interface device. Client device 46 can be a stationary terminal or a mobile device. For example, client device 46 can be a desktop computer, a computer server with a user interface, a laptop computer, a tablet, a smartphone, a PDA, or any other type of mobile or non-mobile device.

Extremum-Seeking Control Systems with Periodic Dither Signals

Figure 3:
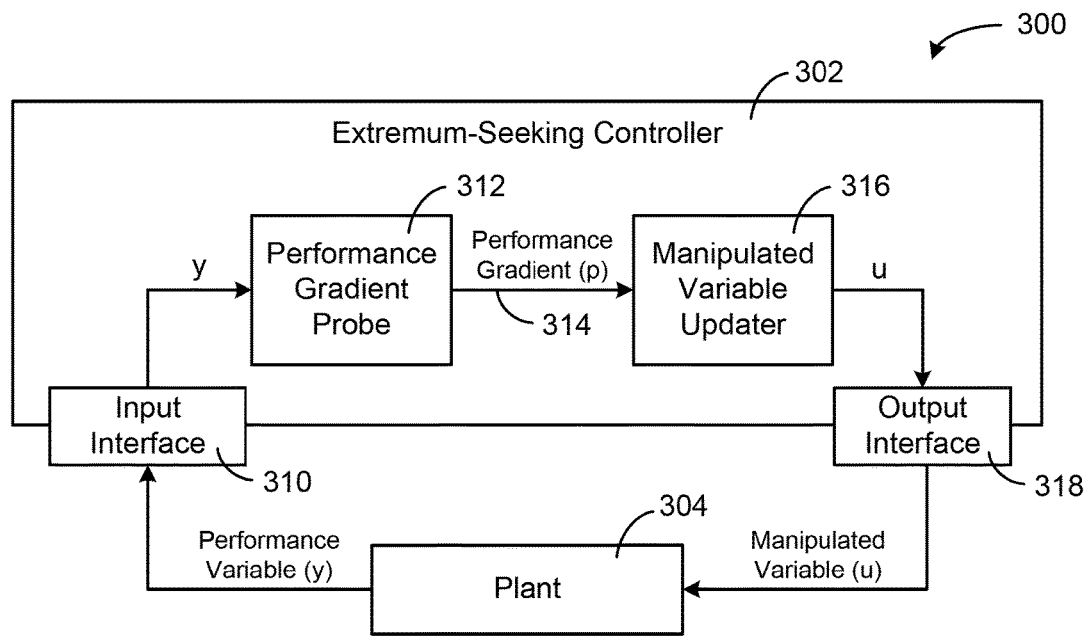
FIG. 3 is a block diagram of an extremum-seeking control system which uses a periodic dither signal to perturb a control input provided to a plant, according to some embodiments.

Referring now to FIG. 3, a block diagram of an extremum-seeking control (ESC) system 300 with a periodic dither signal is shown, according to some embodiments. ESC system 300 is shown to include an extremum-seeking controller 302 and a plant 304. A plant in control theory is the combination of a process and one or more mechanically-controlled outputs. For example, plant 304 can be an air handling unit configured to control temperature within a building space via one or more mechanically-controlled actuators and/or dampers. In various embodiments, plant 304 can include a chiller operation process, a damper adjustment process, a mechanical cooling process, a ventilation process, a refrigeration process, or any other process in which an input variable to plant 304 (i.e., manipulated variable u) is adjusted to affect an output from plant 304 (i.e., performance variable y).

Extremum-seeking controller 302 uses extremum-seeking control logic to modulate the manipulated variable u. For example, controller 302 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u. Controller 302 uses extremum-seeking control logic to determine a value for the manipulated variable u that drives the performance gradient p to zero.

Controller 302 may determine the DC value of manipulated variable u based on a measurement or other indication of the performance variable y received as feedback from plant 304 via input interface 310. Measurements from plant 304 can include, but are not limited to, information received from sensors about the state of plant 304 or control signals sent to other devices in the system. In some embodiments, the performance variable y is a measured or observed position of one of valves 92-94. In other embodiments, the performance variable y is a measured or calculated amount of power consumption, a fan speed, a damper position, a temperature, or any other variable that can be measured or calculated by plant 304. Performance variable y can be the variable that extremum-seeking controller 302 seeks to optimize via an extremum-seeking control technique. Performance variable y can be output by plant 304 or observed at plant 304 (e.g., via a sensor) and provided to extremum-seeking controller at input interface 310.

Input interface 310 provides the performance variable y to performance gradient probe 312 to detect the performance gradient 314. Performance gradient 314 may indicate a slope of the function $y=f(u)$, where y represents the performance variable received from plant 304 and u represents the manipulated variable provided to plant 304. When performance gradient 314 is zero, the performance variable y has an extremum value (e.g., a maximum or minimum). Therefore, extremum-seeking controller 302 can optimize the value of the performance variable y by driving performance gradient 314 to zero.

Manipulated variable updater 316 produces an updated manipulated variable u based upon performance gradient 314. In some embodiments, manipulated variable updater 316 includes an integrator to drive performance gradient 314 to zero. Manipulated variable updater 316 then provides an updated manipulated variable u to plant 304 via output interface 318. In some embodiments, manipulated variable u is provided to one of dampers 60-64 (FIG. 2) or an actuator affecting dampers 60-64 as a control signal via output interface 318. Plant 304 can use manipulated variable u as a setpoint to adjust the position of dampers 60-64 and thereby control the relative proportions of outdoor air 80 and recirculation air 83 provided to a temperature-controlled space.

Figure 4:
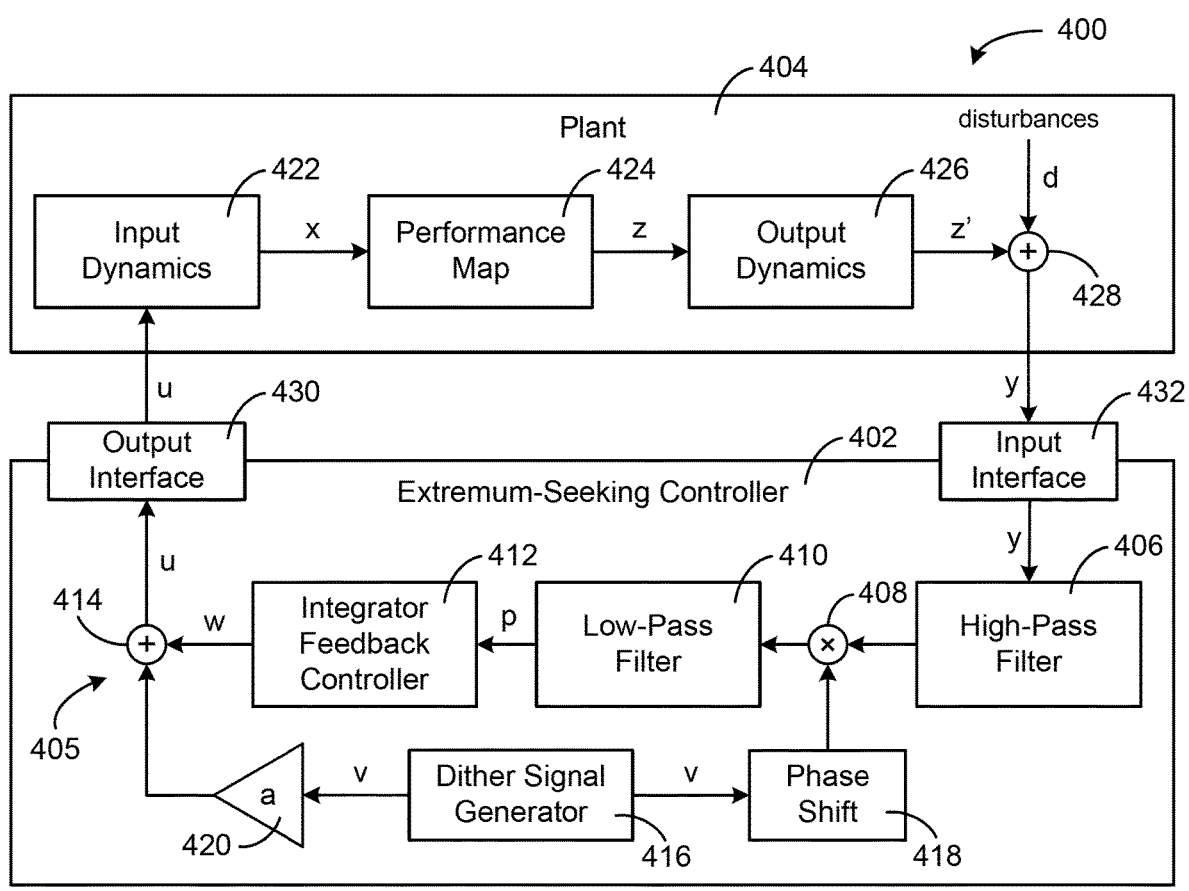
FIG. 4 is a block diagram of another extremum-seeking control system which uses a periodic dither signal to perturb a control input provided to a plant, according to some embodiments.

Referring now to FIG. 4, a block diagram of another ESC system 400 with a periodic dither signal is shown, according to some embodiments. ESC system 400 is shown to include a plant 404 and an extremum-seeking controller 402. Controller 402 uses an extremum-seeking control strategy to optimize a performance variable y received as an output from plant 404. Optimizing performance variable y can include minimizing y, maximizing y, controlling y to achieve a setpoint, or otherwise regulating the value of performance variable y.

Plant 404 can be the same as plant 304 or similar to plant 304, as described with reference to FIG. 3. For example, plant 404 can be a combination of a process and one or more mechanically-controlled outputs. In some embodiments, plant 404 is an air handling unit configured to control temperature within a building space via one or more mechanically-controlled actuators and/or dampers. In other embodiments, plant 404 can include a chiller operation process, a damper adjustment process, a mechanical cooling process, a ventilation process, or any other process that generates an output based on one or more control inputs.

Plant 404 can be represented mathematically as a combination of input dynamics 422, a performance map 424, output dynamics 426, and disturbances d. In some embodiments, input dynamics 422 are linear time-invariant (LTI) input dynamics and output dynamics 426 are LTI output dynamics. Performance map 424 can be a static nonlinear performance map. Disturbances d can include process noise, measurement noise, or a combination of both. Although the components of plant 404 are shown in FIG. 4, it should be noted that the actual mathematical model for plant 404 does not need to be known in order to apply ESC.

Plant 404 receives a control input u (e.g., a control signal, a manipulated variable, etc.) from extremum-seeking controller 402 via output interface 430. Input dynamics 422 may use the control input u to generate a function signal x based on the control input (e.g., $x=f(u)$). Function signal x may be passed to performance map 424 which generates an output signal z as a function of the function signal (i.e., $z=f(x)$). The output signal z may be passed through output dynamics 426 to produce signal z', which is modified by disturbances d to produce performance variable y (e.g., $y=z'+d$). Performance variable y is provided as an output from plant 404 and received at extremum-seeking controller 402. Extremum-seeking controller 402 may seek to find values for x and/or u that optimize the output z of performance map 424 and/or the performance variable y.

Still referring to FIG. 4, extremum-seeking controller 402 is shown receiving performance variable y via input interface 432 and providing performance variable y to a control loop 405 within controller 402. Control loop 405 is shown to include a high-pass filter 406, a demodulation element 408, a low-pass filter 410, an integrator feedback controller 412, and a dither signal element 414. Control loop 405 may be configured to extract a performance gradient p from performance variable y using a dither-demodulation technique. Integrator feedback controller 412 analyzes the performance gradient p and adjusts the DC value of the plant input (i.e., the variable w) to drive performance gradient p to zero.

The first step of the dither-demodulation technique is performed by dither signal generator 416 and dither signal element 414. Dither signal generator 416 generates a periodic dither signal v, which is typically a sinusoidal signal. Dither signal element 414 receives the dither signal v from dither signal generator 416 and the DC value of the plant input w from controller 412. Dither signal element 414 combines dither signal v with the DC value of the plant input w to generate the perturbed control input u provided to plant 404 (e.g., $u=w+v$). The perturbed control input u is provided to plant 404 and used by plant 404 to generate performance variable y as previously described.

The second step of the dither-demodulation technique is performed by high-pass filter 406, demodulation element 408, and low-pass filter 410. High-pass filter 406 filters the performance variable y and provides the filtered output to demodulation element 408. Demodulation element 408 demodulates the output of high-pass filter 406 by multiplying the filtered output by the dither signal v with a phase shift 418 applied. The DC value of this multiplication is proportional to the performance gradient p of performance variable y with respect to the control input u. The output of demodulation element 408 is provided to low-pass filter 410, which extracts the performance gradient p (i.e., the DC value of the demodulated output). The estimate of the performance gradient p is then provided to integrator feedback controller 412, which drives the performance gradient estimate p to zero by adjusting the DC value w of the plant input u.

Figure 6A:
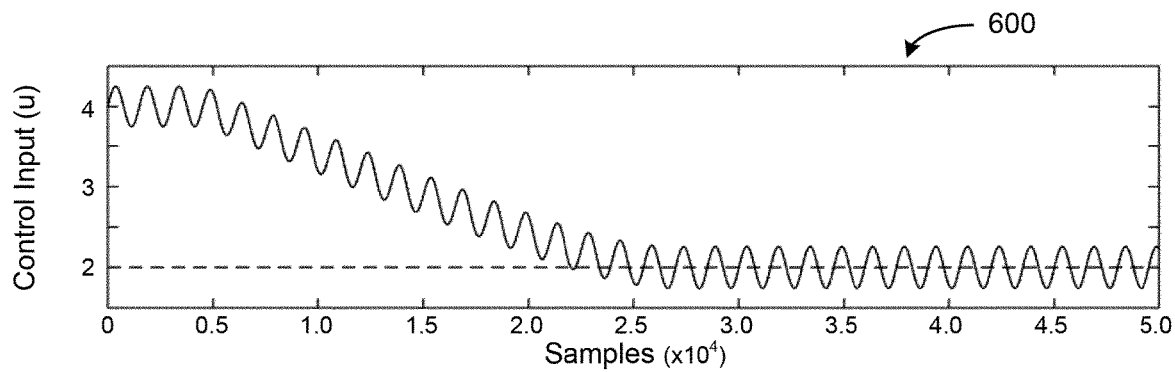
FIG. 6A is a graph of a control input provided to a plant, illustrating periodic oscillations caused by perturbing the control input with a periodic dither signal, according to some embodiments.
Figure 6B:
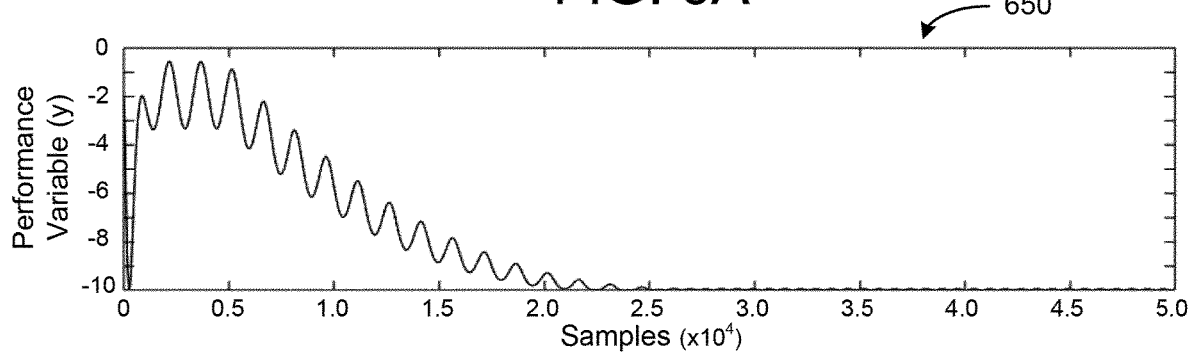
FIG. 6B is a graph of a performance variable received from the plant resulting from the perturbed control input shown in FIG. 6A, according to some embodiments.

Still referring to FIG. 4, extremum-seeking controller 402 is shown to include an amplifier 420. It may be desirable to amplify the dither signal v such that the amplitude of the dither signal v is large enough for the effects of dither signal v to be evident in the plant output y. The large amplitude of dither signal v can result in large variations in the control input u, even when the DC value w of the control input u remains constant. Graphs illustrating a control input u and a performance variable y with periodic oscillations caused by a periodic dither signal v are shown in FIGS. 6A-6B (described in greater detail below). Due to the periodic nature of the dither signal v, the large variations in the plant input u (i.e., the oscillations caused by the dither signal v) are often noticeable to plant operators.

Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 304 to enhance the effect of the dither signal v on the performance variable y. It can be difficult and challenging to properly select the dither frequency $\omega_v$ without knowledge of the dynamics of plant 404. For these reasons, the use of a periodic dither signal v is one of the drawbacks of traditional ESC.

In ESC system 400, the output of high-pass filter 406 can be represented as the difference between the value of the performance variable y and the expected value of the performance variable y, as shown in the following equation:

Output of High-Pass Filter: $y-E[y]$ where the variable E[y] is the expected value of the performance variable y. The result of the cross-correlation performed by demodulation element 408 (i.e., the output of demodulation element 408) can be represented as the product of the high-pass filter output and the phase-shifted dither signal, as shown in the following equation:

Result of Cross-Correlation: $(y-E[y])(v-E[v])$ where the variable E[v] is the expected value of the dither signal v. The output of low-pass filter 410 can be represented as the covariance of the dither signal v and the performance variable y, as shown in the following equation:

Output of Low-Pass Filter: $E[(y-E[y])(v-E[U])] \equiv \text{Cov}(v,y)$ where the variable E[u] is the expected value of the control input u.

The preceding equations show that ESC system 400 generates an estimate for the covariance Cov(v, y) between the dither signal v and the plant output (i.e., the performance variable y). The covariance Cov(v, y) can be used in ESC system 400 as a proxy for the performance gradient p. For example, the covariance Cov(v, y) can be calculated by high-pass filter 406, demodulation element 408, and low-pass filter 410 and provided as a feedback input to integrator feedback controller 412. Integrator feedback controller 412 can adjust the DC value w of the plant input u in order to minimize the covariance Cov(v, y) as part of the feedback control loop.

Extremum-Seeking Control System with Stochastic Excitation Signal

Figure 5:
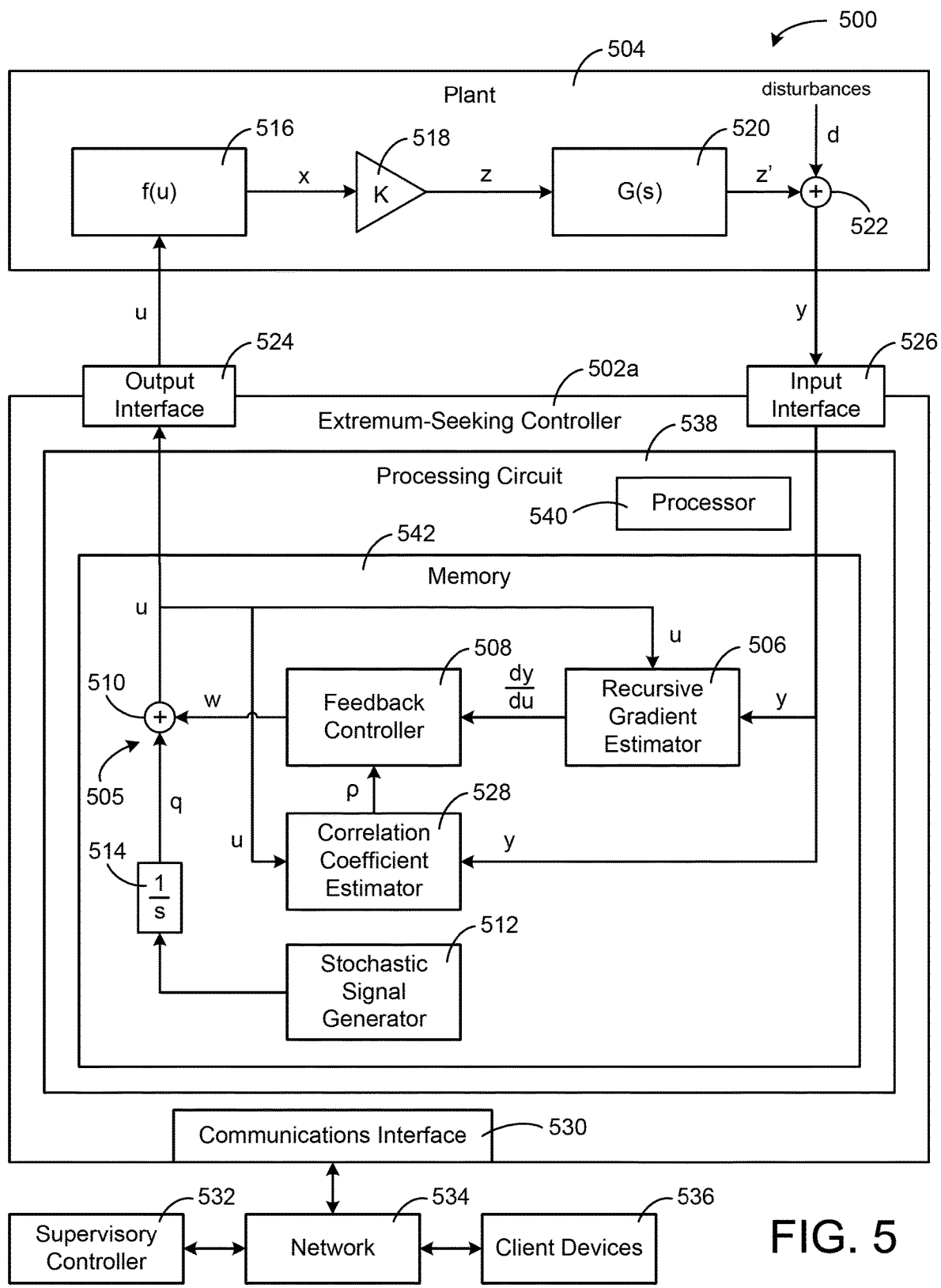
FIG. 5 is a block diagram of an extremum-seeking control system which uses a stochastic dither signal to perturb a control input provided to a plant and a recursive estimation technique to estimate a gradient or coefficient relating an output of the plant to the control input, according to some embodiments.

Referring now to FIG. 5, a block diagram of an ESC system 500 with a stochastic excitation signal is shown, according to some embodiments. ESC system 500 is shown to include a plant 504 and an extremum-seeking controller 502a. Controller 502a is shown receiving a performance variable y as feedback from plant 504 via input interface 526 and providing a control input u to plant 504 via output interface 524. Controller 502a may operate in a manner similar to controllers 302 and 402, as described with reference to FIGS. 3-4. For example, controller 502a can use an extremum-seeking control (ESC) strategy to optimize the performance variable y received as an output from plant 504. However, rather than perturbing the control input u with a periodic dither signal, controller 502a may perturb the control input u with a stochastic excitation signal q. Controller 502a can adjust the control input u to drive the gradient of performance variable y to zero. In this way, controller 502a identifies values for control input u that achieve an optimal value (e.g., a maximum or a minimum) for performance variable y.

In some embodiments, the ESC logic implemented by controller 502a generates values for control input u based on a received control signal (e.g., a setpoint, an operating mode signal, etc.). The control signal may be received from a user control (e.g., a thermostat, a local user interface, etc.), client devices 536 (e.g., computer terminals, mobile user devices, cellular phones, laptops, tablets, desktop computers, etc.), a supervisory controller 532, or any other external system or device. In various embodiments, controller 502a can communicate with external systems and devices directly (e.g., using NFC, Bluetooth, WiFi direct, cables, etc.) or via a communications network 534 (e.g., a BACnet network, a LonWorks network, a LAN, a WAN, the Internet, a cellular network, etc.) using wired or wireless electronic data communications Plant 504 can be similar to plant 404, as described with reference to FIG. 4. For example, plant 504 can be a combination of a process and one or more mechanically-controlled outputs. In some embodiments, plant 504 is an air handling unit configured to control temperature within a building space via one or more mechanically-controlled actuators and/or dampers. In other embodiments, plant 404 can include a chiller operation process, a damper adjustment process, a mechanical cooling process, a ventilation process, or any other process that generates an output based on one or more control inputs.

Plant 504 can be represented mathematically as a static nonlinearity in series with a dynamic component. For example, plant 504 is shown to include a static nonlinear function block 516 in series with a constant gain block 518 and a transfer function block 520. Although the components of plant 504 are shown in FIG. 5, it should be noted that the actual mathematical model for plant 504 does not need to be known in order to apply ESC. Plant 504 receives a control input u (e.g., a control signal, a manipulated variable, etc.) from extremum-seeking controller 502a via output interface 524. Nonlinear function block 516 can use the control input u to generate a function signal x based on the control input (e.g., $x=f(u)$). Function signal x can be passed to constant gain block 518, which multiplies the function signal x by the constant gain K to generate the output signal z (i.e., $z=Kx$). The output signal z can be passed through transfer function block 520 to produce signal z', which is modified by disturbances d to produce performance variable y (e.g., $y=z'+d$). Disturbances d can include process noise, measurement noise, or a combination of both. Performance variable y is provided as an output from plant 504 and received at extremum-seeking controller 502a.

Still referring to FIG. 5, controller 502a is shown to include a communications interface 530, an input interface 526, and an output interface 524. Interfaces 530 and 524-526 can include any number of jacks, wire terminals, wire ports, wireless antennas, or other communications interfaces for communicating information and/or control signals. Interfaces 530 and 524-526 can be the same type of devices or different types of devices. For example, input interface 526 can be configured to receive an analog feedback signal (e.g., an output variable, a measured signal, a sensor output, a controlled variable) from plant 504, whereas communications interface 530 can be configured to receive a digital setpoint signal from supervisory controller 532 via network 534. Output interface 524 can be a digital output (e.g., an optical digital interface) configured to provide a digital control signal (e.g., a manipulated variable, a control input) to plant 504. In other embodiments, output interface 524 is configured to provide an analog output signal.

In some embodiments interfaces 530 and 524-526 can be joined as one or two interfaces rather than three separate interfaces. For example, communications interface 530 and input interface 526 can be combined as one Ethernet interface configured to receive network communications from supervisory controller 532. In some embodiments, supervisory controller 532 provides both a setpoint and feedback via an Ethernet network (e.g., network 534). In such an embodiment, output interface 524 may be specialized for a controlled component of plant 504. In other embodiments, output interface 524 can be another standardized communications interface for communicating data or control signals. Interfaces 530 and 524-526 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 5, controller 502a is shown to include a processing circuit 538 having a processor 540 and memory 542. Processor 540 can be a general purpose or specific purpose processor, an application specific integrated circuit (ASIC), one or more field programmable gate arrays (FPGAs), a group of processing components, or other suitable processing components. Processor 540 is configured to execute computer code or instructions stored in memory 542 or received from other computer readable media (e.g., CDROM, network storage, a remote server, etc.).

Memory 542 can include one or more devices (e.g., memory units, memory devices, storage devices, etc.) for storing data and/or computer code for completing and/or facilitating the various processes described in the present disclosure. Memory 542 can include random access memory (RAM), read-only memory (ROM), hard drive storage, temporary storage, non-volatile memory, flash memory, optical memory, or any other suitable memory for storing software objects and/or computer instructions. Memory 542 can include database components, object code components, script components, or any other type of information structure for supporting the various activities and information structures described in the present disclosure. Memory 542 can be communicably connected to processor 540 via processing circuit 538 and can include computer code for executing (e.g., by processor 540) one or more processes described herein.

Still referring to FIG. 5, extremum-seeking controller 502a is shown receiving performance variable y via input interface 526 and providing performance variable y to a control loop 505 within controller 502a. Control loop 505 is shown to include a recursive gradient estimator 506, a feedback controller 508, and an excitation signal element 510. Control loop 505 may be configured to determine the gradient $$\frac{dy}{du}$$

of the performance variable y with respect to the control input u and to adjust the DC value of the control input u (i.e., the variable w) to drive the gradient $$\frac{dy}{du}$$

to zero.

Recursive Gradient Estimation

Recursive gradient estimator 506 can be configured to estimate the gradient $$\frac{dy}{du}$$

of the performance variable y with respect to the control input u. The gradient $$\frac{dy}{du}$$

may be similar to the performance gradient p determined in ESC system 400. However, the fundamental difference between ESC system 500 and ESC system 400 is the way that the gradient $$\frac{dy}{du}$$

is obtained. In ESC system 400, the performance gradient p is obtained via the dither-demodulation technique described with reference to FIG. 4, which is analogous to covariance estimation. Conversely, the gradient $$\frac{dy}{du}$$

in ESC system 500 is obtained by performing a recursive regression technique to estimate the slope of the performance variable y with respect to the control input u. The recursive estimation technique may be performed by recursive gradient estimator 506.

Recursive gradient estimator 506 can use any of a variety of recursive estimation techniques to estimate the gradient $$\frac{dy}{du}.$$

For example, recursive gradient estimator 506 can use a recursive least-squares (RLS) estimation technique to generate an estimate of the gradient $$\frac{dy}{du}.$$

In some embodiments, recursive gradient estimator 506 uses exponential forgetting as part of the RLS estimation technique. Exponential forgetting reduces the required amount of data storage relative to batch processing. Exponential forgetting also allows the RLS estimation technique to remain more sensitive to recent data and thus more responsive to a shifting optimal point. An example a RLS estimation technique which can be performed recursive gradient estimator 506 is described in detail below.

Recursive gradient estimator 506 is shown receiving the performance variable y from plant 504 and the control input u from excitation signal element 510. In some embodiments, recursive gradient estimator 506 receives multiple samples or measurements of the performance variable y and the control input u over a period of time. Recursive gradient estimator 506 can use a sample of the control input u at time k to construct an input vector $x_k$ as shown in the following equation:

$$x_k = \begin{bmatrix} 1 \\ u_k \end{bmatrix}$$

where $u_k$ is the value of the control input u at time k. Similarly, recursive gradient estimator 506 can construct a parameter vector $\hat{\theta}_k$ as shown in the following equation:

$$\hat{\theta}_k = \begin{bmatrix} \hat{\theta}_1 \\ \hat{\theta}_2 \end{bmatrix}$$

where the parameter $\hat{\theta}_2$ is the estimate of the gradient $$\frac{dy}{du}$$

at time k.

Recursive gradient estimator 506 can estimate the performance variable $\hat{y}_k$ at time k using the following linear model:

$$\hat{y}_k = x_k^T \hat{\theta}_{k-1}$$

The prediction error of this model is the difference between the actual value of the performance variable $y_k$ at time k and the estimated value of the performance variable $\hat{y}_k$ at time k as shown in the following equation:

$$e_k = y_k - \hat{y}_k = y_k - x_k^T \hat{\theta}_{k-1}$$

Recursive gradient estimator 506 can use the estimation error $e_k$ in the RLS technique to determine the parameter values $\hat{\theta}_k$. Any of a variety of RLS techniques can be used in various implementations. An example of a RLS technique which can be performed by recursive gradient estimator 506 is as follows:

$$g_k = P_{k-1} x_k (\lambda + x_k^T P_{k-1} x_k)^{-1}$$

$$P_k = \lambda^{-1} P_{k-1} - g_k x_k^T \lambda^{-1} P_{k-1}$$

$$\hat{\theta}_k = \hat{\theta}_{k-1} + e_k g_k$$

where $g_k$ is a gain vector, $P_k$ is a covariance matrix, and $\lambda$ is a forgetting factor ($\lambda < 1$). In some embodiments, the forgetting factor $\lambda$ is defined as follows:

$$\lambda = e^{-\frac{\Delta t}{\tau}}$$

where $\Delta t$ is the sampling period and $\tau$ is the forgetting time constant.

Recursive gradient estimator 506 can use the equation for $g_k$ to calculate the gain vector $g_k$ at time k based on a previous value of the covariance matrix $P_{k-1}$ at time k−1, the value of the input vector $x_k^T$ at time k, and the forgetting factor. Recursive gradient estimator 506 can use the equation for $P_k$ to calculate the covariance matrix $P_k$ at time k based on the forgetting factor $\lambda$, the value of the gain vector $g_k$ at time k, and the value of the input vector $x_k^T$ at time k. Recursive gradient estimator 506 can use the equation for $\hat{\theta}_k$ to calculate the parameter vector $\hat{\theta}_k$ at time k based on the error $e_k$ at time k and the gain vector $g_k$ at time k. Once the parameter vector $\hat{\theta}_k$ is calculated, recursive gradient estimator 506 can determine the value of the gradient $$\frac{dy}{du}$$

by extracting the value of the $\hat{\theta}_2$ parameter from $\hat{\theta}_k$, as shown in the following equations:

$$\hat{\theta}_k = \begin{bmatrix} \hat{\theta}_1 \\ \hat{\theta}_2 \end{bmatrix}, \frac{dy}{du} = \hat{\theta}_2$$

In various embodiments, recursive gradient estimator 506 can use any of a variety of other recursive estimation techniques to estimate $$\frac{dy}{du}.$$

For example, recursive gradient estimator 506 can use a Kalman filter, a normalized gradient technique, an unnormalized gradient adaption technique, a recursive Bayesian estimation technique, or any of a variety of linear or nonlinear filters to estimate $$\frac{dy}{du}.$$

In other embodiments, recursive gradient estimator 506 can use a batch estimation technique rather than a recursive estimation technique. As such, gradient estimator 506 can be a batch gradient estimator rather than a recursive gradient estimator. In a batch estimation technique, gradient estimator 506 can use a batch of previous values for the control input u and the performance variable y (e.g., a vector or set of previous or historical values) as inputs to a batch regression algorithm. Suitable regression algorithms may include, for example, ordinary least squares regression, polynomial regression, partial least squares regression, ridge regression, principal component regression, or any of a variety of linear or nonlinear regression techniques.

In some embodiments, it is desirable for recursive gradient estimator 506 to use a recursive estimation technique rather than a batch estimation technique due to several advantages provided by the recursive estimation technique. For example, the recursive estimation technique described above (i.e., RLS with exponential forgetting) has been shown to greatly improve the performance of the gradient estimation technique relative to batch least-squares. In addition to requiring less data storage than batch processing, the RLS estimation technique with exponential forgetting can remain more sensitive to recent data and thus more responsive to a shifting optimal point.

In some embodiments, recursive gradient estimator 506 estimates the gradient $$\frac{dy}{du}$$

using the covariance between the control input u and the performance variable y. For example, the estimate of the slope $\hat{\beta}$ in a least-squares approach can be defined as:

$$\hat{\beta} = \frac{\text{Cov}(u, y)}{\text{Var}(u)}$$

where Cov(u, y) is the covariance between the control input u and the performance variable y, and Var(u) is the variance of the control input u. Recursive gradient estimator 506 can calculate the estimated slope $\hat{\beta}$ using the previous equation and use the estimated slope $\hat{\beta}$ as a proxy for the gradient $$\frac{dy}{du}.$$

Notably, the estimated slope $\hat{\beta}$ is a function of only the control input u and the performance variable y. This is different from the covariance derivation technique described with reference to FIG. 4 in which the estimated performance gradient p was a function of the covariance between the dither signal v and the performance variable y. By replacing the dither signal v with the control input u, controller 502a can generate an estimate for the slope $\hat{\beta}$ without any knowledge of the dither signal v (shown in FIG. 4) or the excitation signal q (shown in FIG. 5).

In some embodiments, recursive gradient estimator 506 uses a higher-order model (e.g., a quadratic model, a cubic model, etc.) rather than a linear model to estimate the performance variable $\hat{y}_k$. For example, recursive gradient estimator 506 can estimate the performance variable $\hat{y}_k$ at time k using the following quadratic model:

$$\hat{y}_k = \hat{\theta}_1 + \hat{\theta}_2 u_k + \hat{\theta}_3 u_k^2 + \epsilon_k$$

which can be written in the form $\hat{y}_k = x_k^T \hat{\theta}_{k-1}$ by updating the input vector $x_k$ and the parameter vector $\hat{\theta}_k$ as follows:

$$x_k = \begin{bmatrix} 1 \\ u_k \\ u_k^2 \end{bmatrix} \quad \hat{\theta}_k = \begin{bmatrix} \hat{\theta}_1 \\ \hat{\theta}_2 \\ \hat{\theta}_3 \end{bmatrix}$$

Recursive gradient estimator 506 can use the quadratic model to fit a quadratic curve (rather than a straight line) to the data points defined by combinations of the control input u and the performance variable y at various times k. The quadratic model provides second-order information not provided by the linear model and can be used to improve the convergence of feedback controller 508. For example, with a linear model, recursive gradient estimator 506 can calculate the gradient $$\frac{dy}{du}$$

at a particular location along the curve (i.e., for a particular value of the control input u) and can provide the gradient $$\frac{dy}{du}$$

as a feedback signal. For embodiments that use a linear model to estimate $\hat{y}_k$, the gradient $$\frac{dy}{du}$$

(i.e., the derivative of the linear model with respect to u) is a scalar value. When controller 508 receives a scalar value for the gradient $$\frac{dy}{du}$$

as a feedback signal, controller 508 can incrementally adjust the value of the control input u in a direction that drives the gradient $$\frac{dy}{du}$$

toward zero until the optimal value of the control input u is reached (i.e., the value of the control input u that results in the gradient $$\frac{dy}{du} = 0 \bigg).$$

With a quadratic model, recursive gradient estimator 506 can provide feedback controller 508 with a function for the gradient $$\frac{dy}{du}$$

rather than a simple scalar value. For embodiments that use a quadratic model to estimate $\hat{y}_k$, the gradient $$\frac{dy}{du}$$

(i.e., the derivative of the quadratic model with respect to u) is a linear function of the control input u $$\left( e.g., \frac{dy}{du} = 2\hat{\theta}_3 u_k + \hat{\theta}_2 \right).$$

When controller 508 receives a linear function for the gradient $$\frac{dy}{du}$$

as a feedback signal, controller 508 can analytically calculate the optimal value of the control input u that will result in the gradient $$\frac{dy}{du} = 0 \left( e.g., u_{k,opt} = -\frac{\hat{\theta}_2}{2\hat{\theta}_3} \right).$$

Accordingly, controller 508 can adjust the control input u using smart steps that rapidly approach the optimal value without relying on incremental adjustment and experimentation to determine whether the gradient $$\frac{dy}{du}$$

is moving toward zero.

Stochastic Excitation Signal

Still referring to FIG. 5, extremum-seeking controller 502a is shown to include a stochastic signal generator 512 and an integrator 514. In order to estimate the gradient $$\frac{dy}{du}$$

reliably, it may be desirable to provide sufficient variation in the control input u that carries through to the performance variable y. Controller 502a can use stochastic signal generator 512 and integrator 514 to generate a persistent excitation signal q. The excitation signal q can be added to the DC value w of the control input u at excitation signal element 510 to form the control input u (e.g., u=w+q).

Stochastic signal generator 512 can be configured to generate a stochastic signal. In various embodiments, the stochastic signal can be a random signal (e.g., a random walk signal, a white noise signal, etc.), a non-periodic signal, an unpredictable signal, a disturbance signal, or any other type of non-deterministic or non-repeating signal. In some embodiments, the stochastic signal has a non-zero mean. The stochastic signal can be integrated by integrator 514 to generate the excitation signal q.

Excitation signal q can provide variation in the control input u sufficient for the gradient estimation technique performed by recursive gradient estimator 506. In some instances, the addition of excitation signal q causes the control input u to drift away from its optimum value. However, feedback controller 508 can compensate for such drift by adjusting the DC value w such that the control input u is continuously pulled back toward its optimum value. As with traditional ESC, the magnitude of the excitation signal q can be selected (e.g., manually by a user or automatically by controller 502a) to overcome any additive noise found in the performance variable y (e.g., process noise, measurement noise, etc.).

Figure 7A:
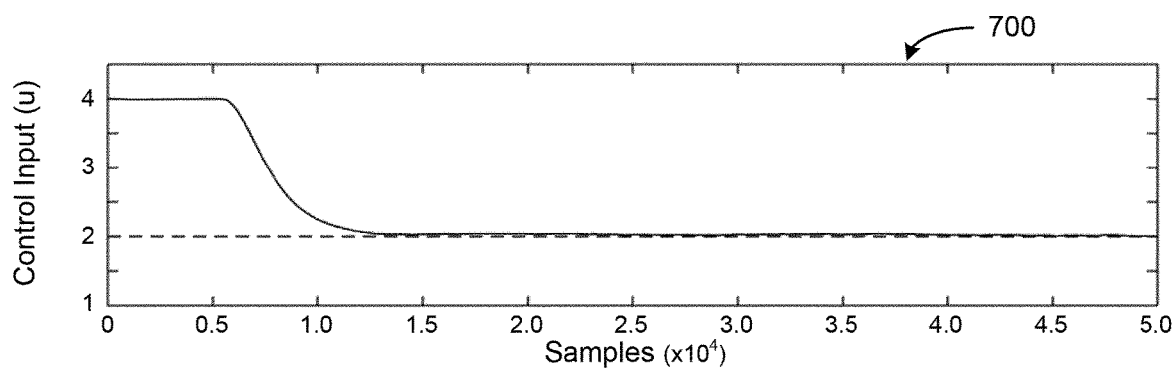
FIG. 7A is a graph of a control input provided to a plant when a stochastic excitation signal is used to perturb the control input, according to some embodiments.
Figure 7B:
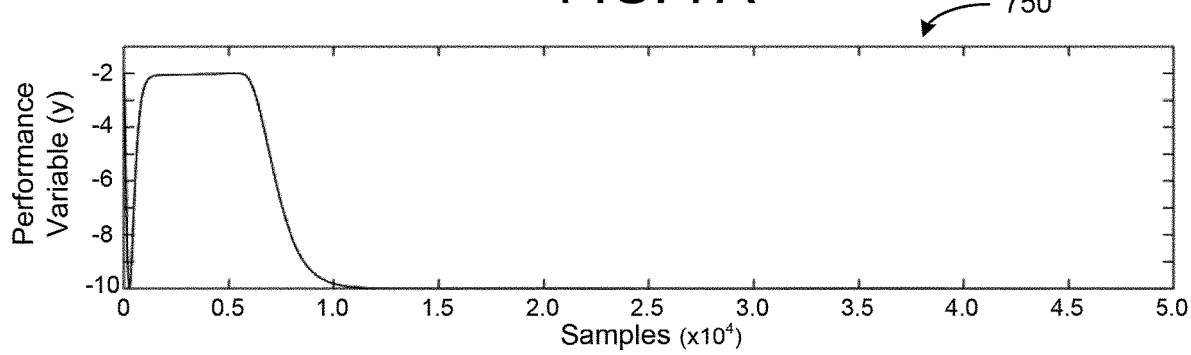
FIG. 7B is a graph of a performance variable received from the plant resulting from the perturbed control input shown in FIG. 7A, according to some embodiments.

The stochastic excitation signal q generated by extremum-seeking controller 502a has several advantages over the periodic dither signal v generated by controller 402. For example, the stochastic excitation signal q is less perceptible than a traditional periodic dither signal v. As such, the effects of the stochastic excitation signal q on the control input u are less noticeable than the periodic oscillations caused by the traditional periodic dither signal v. Graphs illustrating a control input u excited by the stochastic excitation signal q and the resulting performance variable y are shown in FIGS. 7A-7B (described in greater detail below).

Another advantage of the stochastic excitation signal q is that tuning controller 502a is simpler because the dither frequency co, is no longer a required parameter. Accordingly, controller 502a does not need to know or estimate the natural frequency of plant 504 when generating the stochastic excitation signal q. In some embodiments, extremum-seeking controller 502a provides multiple control inputs u to plant 504. Each of the control inputs can be excited by a separate stochastic excitation signal q. Since each of the stochastic excitation signals q is random, there is no need to ensure that the stochastic excitation signals q are not correlated with each other. Controller 502a can calculate the gradient $$\frac{dy}{du}$$

of the performance variable y with respect to each of the control inputs u without performing a frequency-specific dither-demodulation technique.

Correlation Coefficient

One of the problems with traditional ESC is that the performance gradient $$\frac{dy}{du}$$

is a function of the range or scale of the performance variable y. The range or scale of the performance variable y can depend on the static and dynamic components of plant 504. For example, plant 504 is shown to include a nonlinear function $f(u)$ (i.e., function block 516) in series with a constant gain K (i.e., constant gain block 518). It is apparent from this representation that the range or scale of the performance variable y is a function of the constant gain K.

The value of the performance gradient $$\frac{dy}{du}$$

may vary based on the value of the control input u due to the nonlinearity provided by the nonlinear function $f(u)$. However, the scale of the performance gradient $$\frac{dy}{du}$$

is also dependent upon the value of the constant gain K. For example, the performance gradient $$\frac{dy}{du}$$

can be determined using the following equation:

$$\frac{dy}{du} = Kf'(u)$$

where K is the constant gain and $f'(u)$ is the derivative of the function $f(u)$. It can be desirable to scale or normalize the performance gradient $$\frac{dy}{du}$$

(e.g., by multiplying by a scaling parameter K) in order to provide consistent feedback control loop performance.

However, without knowledge of the scale of the performance variable y (e.g., without knowing the constant gain K applied by plant 504), it can be challenging to determine an appropriate value for the scaling parameter K.

Still referring to FIG. 5, extremum-seeking controller 502a is shown to include a correlation coefficient estimator 528. Correlation coefficient estimator 528 can be configured to generate a correlation coefficient ρ and provide the correlation coefficient ρ to feedback controller 508. The correlation coefficient ρ can be related to the performance gradient $$\frac{dy}{du}\left(e.q., \text{ proportional to } \frac{dy}{du}\right)$$

but scaled based on the range of the performance variable y. For example, the correlation coefficient ρ can be a normalized measure of the performance gradient $$\frac{dy}{du}$$

(e.g., scaled to the range 0≤ρ≤1).

Correlation coefficient estimator 528 is shown receiving the control input u and the performance variable y as inputs. Correlation coefficient estimator 528 can generate the correlation coefficient ρ based on the variance and covariance of the control input u and the performance variable y, as shown in the following equation:

$$\rho = \frac{\text{Cov}(x, y)}{\sqrt{\text{Var}(u)\text{Var}(y)}}$$

where Cov(u, y) is the covariance between the control input u and the performance variable y, Var(u) is the variance of the control input u, and Var(y) is the variance of the performance variable y. The previous equation can be rewritten in terms of the standard deviation $\sigma_u$ of the control input u and the standard deviation $\sigma_y$ of the performance variable y as follows:

$$\rho = \frac{\text{Cov}(u, y)}{\sigma_u \sigma_y}$$

where $\text{Var}(u) = \sigma_u^2$ and $\text{Var}(y) = \sigma_y^2$.

In some embodiments, correlation coefficient estimator 528 estimates the correlation coefficient ρ using a recursive estimation technique. For example, correlation coefficient estimator 528 can calculate exponentially-weighted moving averages (EWMAs) of the control input u and the performance variable y using the following equations:

$$\bar{u}_k = \bar{u}_{k-1} + \frac{u_k - \bar{u}_{k-1}}{\min(k, W)}$$

$$\bar{y}_k = \bar{y}_{k-1} + \frac{y_k - \bar{y}_{k-1}}{\min(k, W)}$$

where $\bar{u}_k$ and $\bar{y}_k$ are the EWMAs of the control input u and the performance variable y at time k, $\bar{u}_{k-1}$ and $\bar{y}_{k-1}$ are the previous EWMAs of the control input u and the performance variable y at time k−1, $u_k$ and $y_k$ are the current values of the control input u and the performance variable y at time k, k is the total number of samples that have been collected of each variable, and W is the duration of the forgetting window.

Similarly, correlation coefficient estimator 528 can calculate EWMAs of the control input variance Var(u), the performance variable variance Var(y), and the covariance Cov(u, y) using the following equations:

$$V_{u,k} = V_{u,k-1} + \frac{(u_k - \bar{u}_k)^2 - V_{u,k-1}}{\min(k, W)}$$

$$V_{y,k} = V_{y,k-1} + \frac{(y_k - \bar{y}_k)^2 - V_{y,k-1}}{\min(k, W)}$$

$$c_k = c_{k-1} + \frac{(y_k - \bar{y}_k)(u_k - \bar{u}_k) - c_{k-1}}{\min(k, W)}$$

where $V_{u,k}$, $V_{y,k}$, and $c_k$ are the EWMAs of the control input variance Var(u), the performance variable variance Var(y), and the covariance Cov(u, y), respectively, at time k. $V_{u,k-1}$, $V_{y,k-1}$, and $c_{k-1}$ are the EWMAs of the control input variance Var(u), the performance variable variance Var(y), and the covariance Cov(u, y), respectively, at time k−1. Correlation coefficient estimator 528 can generate an estimate of the correlation coefficient ρ based on these recursive estimates using the following equation:

$$\hat{\rho}_k = \frac{c_k}{\sqrt{V_{u,k} V_{y,k}}}$$

In some embodiments, correlation coefficient estimator 528 generates the correlation coefficient ρ based on the estimated slope $\hat{\beta}$. As previously described, the estimated slope $\hat{\beta}$ can be calculated using the following equation:

$$\hat{\beta} = \frac{\text{Cov}(u, y)}{\text{Var}(u)} = \frac{\text{Cov}(u, y)}{\sigma_u^2}$$

where Cov(u, y) is the covariance between the control input u and the performance variable y, and Var(u) is the variance of the control input u (i.e., $\sigma_u^2$). Correlation coefficient estimator 528 can calculate the correlation coefficient ρ from the slope $\hat{\beta}$ using the following equation:

$$\rho = \hat{\beta}\frac{\sigma_u}{\sigma_y}$$

From the previous equation, it can be seen that the correlation coefficient ρ and the estimated slope $\hat{\beta}$ are equal when the standard deviations $\sigma_u$ and $\sigma_y$ are equal (i.e., when $\sigma_u = \sigma_y$).

Correlation coefficient estimator 528 can receive the estimated slope $\hat{\beta}$ from recursive gradient estimator 506 or calculate the estimated slope $\hat{\beta}$ using a set of values for the control input u and the performance variable y. For example, with the assumption of finite variance in u and y, correlation coefficient estimator 528 can estimate the slope $\hat{\beta}$ using the following least squares estimation:

$$\hat{\beta} = \left(\sum_{i=t-N}^{t} u_i u_i^T\right)^{-1} \left(\sum_{i=t-N}^{t} u_i y_i\right)$$

For a small range of the control input u, the estimated slope $\hat{\beta}$ can be used as a proxy for the performance gradient, as shown in the following equation:

$$\hat{\beta} = \frac{dy}{du} = Kf'(u)$$

As shown in the previous equation, the estimated slope $\hat{\beta}$ contains the constant gain K, which may be unknown. However, normalization provided by the standard deviations $\sigma_u$ and $\sigma_y$ cancels the effect of the constant gain K. For example, the standard deviation $\sigma_y$ of the performance variable y is related to the standard deviation $\sigma_u$ of the control input u as shown in the following equations:

$$\sigma_y = K\sigma_u$$
$$\frac{\sigma_u}{\sigma_y} = \frac{1}{K}$$

Multiplying the estimated slope $\hat{\beta}$ by the ratio $$\frac{\sigma_u}{\sigma_y}$$

to calculate the correlation coefficient ρ is equivalent to dividing by the constant gain K. Both the correlation coefficient ρ and the estimated slope $\hat{\beta}$ indicate the strength of the relationship between the control input u and the performance variable y. However, the correlation coefficient ρ has the advantage of being normalized which makes tuning the feedback control loop much simpler.

In some embodiments, the correlation coefficient ρ is used by feedback controller 508 instead of the performance gradient $$\frac{dy}{du}.$$

For example, feedback controller 508 can adjust the DC value w of the control input u to drive the correlation coefficient ρ to zero. One advantage of using the correlation coefficient ρ in place of the performance gradient $$\frac{dy}{du}$$

is that the tuning parameters used by feedback controller 508 can be a general set of tuning parameters which do not need to be customized or adjusted based on the scale of the performance variable y. This advantage eliminates the need to perform control-loop-specific tuning for feedback controller 508 and allows feedback controller 508 to use a general set of tuning parameters that are applicable across many different control loops and/or plants.

Example Graphs

Referring now to FIGS. 6A-7B, several graphs 600-750 comparing the performance of extremum-seeking controller 402 and extremum-seeking controller 502a are shown, according to some embodiments. Controllers 402 and 502a were used to control a dynamic system that has an optimal control input value of u=2 and an optimal performance variable of y=−10. Both controllers 402 and 502a were started at a value of u=4 and allowed to adjust the value of the control input u using the extremum-seeking control techniques described with reference to FIGS. 4-5. Controller 402 uses a periodic dither signal v, whereas controller 502a uses a stochastic excitation signal q.

Referring particularly to FIGS. 6A-6B, graphs 600 and 650 illustrate the performance of extremum-seeking controller 402, as described with reference to FIG. 4. Controller 402 uses a periodic dither signal v to perturb the control input u. Graph 600 shows the value of the control input u at various sample times, whereas graph 650 shows corresponding value of the performance variable y. The control input u starts at a value of u=4 and is perturbed using a periodic (i.e., sinusoidal) dither signal v. The oscillatory perturbation caused by the periodic dither signal v is visible in both the control input u and the performance variable y.

Referring particularly to FIGS. 7A-7B, graphs 700 and 750 illustrate the performance of extremum-seeking controller 502a, as described with reference to FIG. 5. Controller 502a uses a stochastic excitation signal q to perturb the control input u. Graph 700 shows the value of the control input u at various sample times, whereas graph 750 shows corresponding value of the performance variable y. The control input u starts at a value of u=4 and is perturbed using a stochastic excitation signal q. The stochastic excitation signal q applies a random walk to the control input u. However, since the stochastic excitation signal q is non-periodic and effective small amplitudes, the perturbation caused by the stochastic excitation signal q is barely discernable in graphs 700 and 750. Additionally, control input u in graph 700 reaches the optimal value quicker than the control input in graph 600.

Extremum-Seeking Control Techniques

Figure 8:
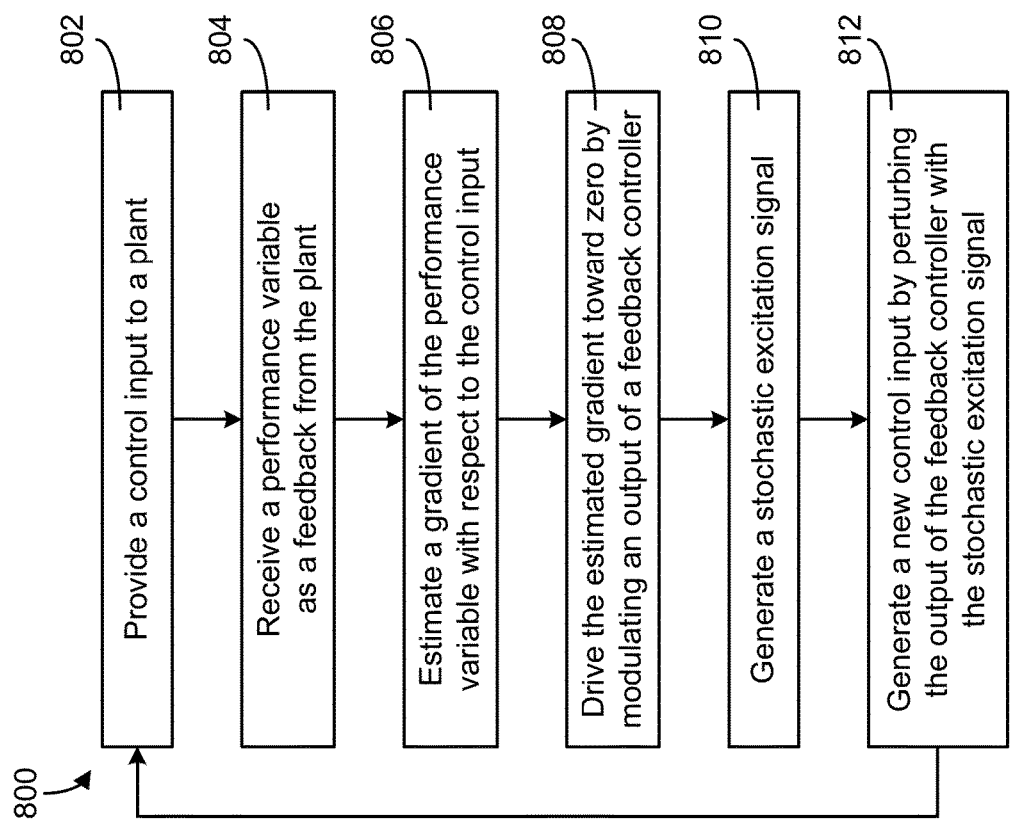
FIG. 8 is a flow diagram illustrating an extremum-seeking control technique in which a stochastic excitation signal is used to perturb a control input to a plant, according to some embodiments.

Referring now to FIG. 8, a flow diagram 800 illustrating an extremum-seeking control (ESC) technique is shown, according to some embodiments. The ESC technique shown in flow diagram 800 can be performed by one or more components of a feedback controller (e.g., controller 502a) to monitor and control a plant (e.g., plant 504). For example, controller 502a can use the ESC technique to determine an optimal value of a control input u provided to plant 504 by perturbing the control input u with a stochastic excitation signal q.

Flow diagram 800 is shown to include providing a control input u to a plant (block 802) and receiving a performance variable y as a feedback from a plant (block 804). The control input u can be provided by an extremum-seeking controller and/or a feedback controller for the plant. The controller can be any of the controllers previously described (e.g., controller 302, controller 402, controller 502a, etc.) or any other type of controller that provides a control input u to a plant. In some embodiments, the controller is an extremum-seeking controller configured to achieve an optimal value for the performance variable y by adjusting the control input u. The optimal value can be an extremum (e.g., a maximum or a minimum) of the performance variable y.

A plant in control theory is the combination of a process and one or more mechanically-controlled outputs. The plant can be any of the plants previously described (e.g., plant 304, plant 404, plant 504, etc.) or any other controllable system or process. For example, the plant can be an air handling unit configured to control temperature within a building space via one or more mechanically-controlled actuators and/or dampers. In various embodiments, the plant can include a chiller operation process, a damper adjustment process, a mechanical cooling process, a ventilation process, a refrigeration process, or any other process in which a control input u to the plant is adjusted to affect the performance variable y. The performance variable y can be a measured variable observed by one or more sensors of the plant (e.g., a measured temperature, a measured power consumption, a measured flow rate, etc.), a calculated variable based on measured or observed values (e.g., a calculated efficiency, a calculated power consumption, a calculated cost, etc.) or any other type of variable that indicates the performance of the plant in response to the control input u.

Flow diagram 800 is shown to include estimating a gradient of the performance variable y with respect to the control input u (block 806). In some embodiments, the gradient is the performance gradient p described with reference to FIG. 4. In other embodiments, the gradient can be the performance gradient $$\frac{dy}{du}$$

or the estimated slope $\hat{\beta}$ described with reference to FIG. 5. For example, the gradient can be a slope or derivative of a curve defined by the function y=ƒ(u) at a particular location along the curve (e.g., at a particular value of u). The gradient can be estimated using one or more pairs of values for the control input u and the performance variable y.

In some embodiments, the gradient is estimated by performing a recursive gradient estimation technique. The recursive gradient estimation technique may include obtaining a model for the performance variable y as a function of the control input u. For example, the gradient can be estimated using the following linear model:

$$\hat{y}_k = x_k^T \hat{\theta}_{k-1}$$

where $x_k$ is an input vector and $\hat{\theta}_k$ is a parameter vector. The input vector $x_k$ and the parameter vector $\hat{\theta}_k$ can be defined as follows:

$$x_k = \begin{bmatrix} 1 \\ u_k \end{bmatrix} \quad \hat{\theta}_k = \begin{bmatrix} \hat{\theta}_1 \\ \hat{\theta}_2 \end{bmatrix}$$

where $u_k$ is the value of the control input u at time k and the parameter $\hat{\theta}_2$ is the estimate of the gradient $$\frac{dy}{du}$$

at time k.

The prediction error of this model is the difference between the actual value of the performance variable $y_k$ at time k and the estimated value of the performance variable $\hat{y}_k$ at time k as shown in the following equation:

$$e_k = y_k - \hat{y}_k = y_k - x_k^T \hat{\theta}_{k-1}$$

The estimation error $e_k$ can be used in the recursive gradient estimation technique to determine the parameter values $\hat{\theta}_k$.

Any of a variety of regression techniques can be used to estimate values for the parameter vector $\hat{\theta}_k$.

In some embodiments, a higher-order model (e.g., a quadratic model, a cubic model, etc.) rather than a linear model can be used to estimate the gradient. For example, the following quadratic model can be used to estimate the gradient $$\frac{dy}{du}$$

at a particular location along the curve defined by the model:

$$\hat{y}_k = \hat{\theta}_1 + \hat{\theta}_2 u_k + \hat{\theta}_3 u_k^2 + \epsilon_k$$

In some embodiments, the gradient is estimated using a recursive least squares (RLS) estimation technique with exponential forgetting. Any of a variety of RLS techniques can be used in various implementations. An example of a RLS technique which can be performed to estimate the gradient is shown in the following equations, which can be solved to determine the value for the parameter vector $\hat{\theta}_k$.

$$g_k = P_{k-1} x_k (\lambda + x_k^T P_{k-1} x_k)^{-1}$$

$$P_k = \lambda^{-1} P_{k-1} - g_k x_k^T \lambda^{-1} P_{k-1}$$

$$\hat{\theta}_k = \hat{\theta}_{k-1} + e_k g_k$$

where $g_k$ is a gain vector, $P_k$ is a covariance matrix, and $\lambda$ is a forgetting factor ($\lambda < 1$). In some embodiments, the forgetting factor $\lambda$ is defined as follows:

$$\lambda = e^{-\frac{\Delta t}{\tau}}$$

where $\Delta t$ is the sampling period and $\tau$ is the forgetting time constant. Once the parameter vector $\hat{\theta}_k$ is calculated, the gradient can be estimated by extracting the value of the $\hat{\theta}_2$ parameter from $\hat{\theta}_k$ In various embodiments, the gradient can be estimated using any of a variety of other recursive estimation techniques. For example, the gradient can be estimated using a Kalman filter, a normalized gradient technique, an unnormalized gradient adaption technique, a recursive Bayesian estimation technique, or any of a variety of linear or non-linear filters. In some embodiments, the gradient can be estimated using a batch estimation technique rather than a recursive estimation technique. In the batch estimation technique, a batch of previous values for the control input u and the performance variable y (e.g., a vector or set of previous or historical values) can be used as inputs to a batch regression algorithm. Suitable regression algorithms may include, for example, ordinary least squares regression, polynomial regression, partial least squares regression, ridge regression, principal component regression, or any of a variety of linear or nonlinear regression techniques.

In some embodiments, the gradient can be estimated using the covariance between the control input u and the performance variable y. For example, the estimate of the slope $\hat{\beta}$ in a least-squares approach can be defined as:

$$\hat{\beta} = \frac{\text{Cov}(u, y)}{\text{Var}(u)}$$

where Cov(u, y) is the covariance between the control input u and the performance variable y, and Var(u) is the variance of the control input u. The estimated slope $\hat{\beta}$ can be calculated using the previous equation and used as a proxy for the gradient $$\frac{dy}{du}.$$

Still referring to FIG. 8, flow diagram 800 is shown to include driving the estimated gradient toward zero by modulating an output of a feedback controller (block 808). In some embodiments, the feedback controller is feedback controller 508 shown in FIG. 5. The feedback controller can receive the estimated gradient as an input and can modulate its output (e.g., DC output w) to drive the estimated gradient toward zero. The feedback controller can increase or decrease the value of the DC output w until an optimum value for the DC output w is reached. The optimum value of the DC output w can be defined as the value which results in an optimum value (e.g., a maximum or minimum value) of the performance variable y. The optimum value of the performance variable y occurs when the gradient is zero. Accordingly, the feedback controller can achieve the optimum value of the performance variable y by modulating its output w to drive the gradient to zero.

Flow diagram 800 is shown to include generating a stochastic excitation signal q (block 810) and generating a new control input u by perturbing the output w of the feedback controller with the stochastic excitation signal q (block 812). The stochastic excitation signal q can be generated by stochastic signal generator 512 and/or integrator 514, as described with reference to FIG. 5. In various embodiments, the stochastic signal can be a random signal (e.g., a random walk signal, a white noise signal, etc.), a non-periodic signal, an unpredictable signal, a disturbance signal, or any other type of non-deterministic or non-repeating signal. In some embodiments, the stochastic signal has a non-zero mean. The stochastic signal can be integrated to generate the excitation signal q.

The stochastic excitation signal q can be added to the DC value w generated by the feedback controller to form the new control input u (e.g., u=w+q). After the new control input u is generated, the new control input u can be provided to the plant (block 802) and the ESC control technique can be repeated. The stochastic excitation signal q can provide variation in the control input u sufficient to estimate the performance gradient in block 806. In some instances, the addition of excitation signal q causes the control input u to drift away from its optimum value. However, the feedback controller can compensate for such drift by adjusting the DC value w such that the control input u is continuously pulled back toward its optimum value. As with traditional ESC, the magnitude of the excitation signal q can be selected (e.g., manually by a user or automatically by the controller) to overcome any additive noise found in the performance variable y (e.g., process noise, measurement noise, etc.).

The stochastic excitation signal q has several advantages over a periodic dither signal v. For example, the stochastic excitation signal q is less perceptible than a traditional periodic dither signal v. As such, the effects of the stochastic excitation signal q on the control input u are less noticeable than the periodic oscillations caused by the traditional periodic dither signal v. Another advantage of the stochastic excitation signal q is that tuning the controller is simpler because the dither frequency $\theta_v$ is no longer a required parameter. Accordingly, the controller does not need to know or estimate the natural frequency of the plant when generating the stochastic excitation signal q.

Figure 9:
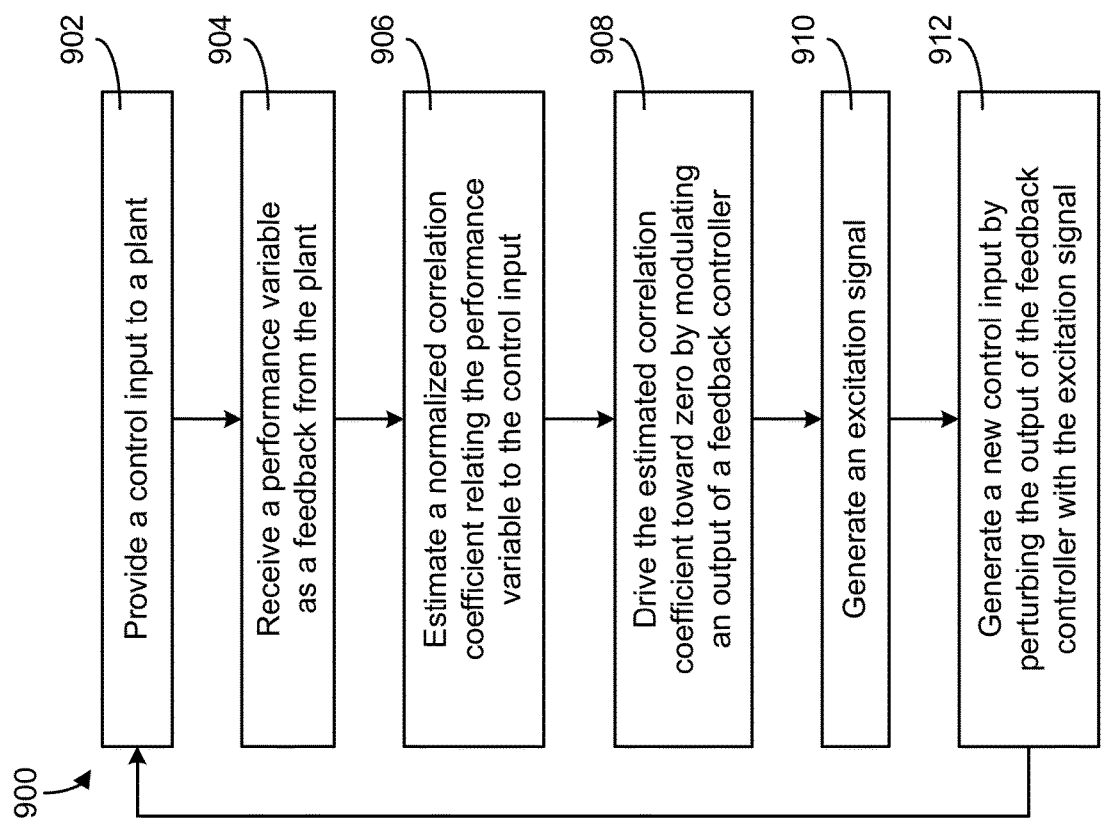
FIG. 9 is a flow diagram illustrating an extremum-seeking control technique in which normalized correlation coefficient is used to relate a performance variable received from the plant to a control input provided to the plant, according to some embodiments.

Referring now to FIG. 9, a flow diagram 900 illustrating another extremum-seeking control (ESC) technique is shown, according to some embodiments. The ESC technique shown in flow diagram 900 can be performed by one or more components of a feedback controller (e.g., controller 502a) to monitor and control a plant (e.g., plant 504). For example, controller 502a can use the ESC technique to estimate a normalized correlation coefficient ρ relating an output of the plant (e.g., performance variable y) to a control input u provided to the plant. Controller 502a can determine an optimal value of the control input u by driving the normalized correlation coefficient ρ to zero.

Flow diagram 900 is shown to include providing a control input u to a plant (block 902) and receiving a performance variable y as a feedback from a plant (block 904). The control input u can be provided by an extremum-seeking controller and/or a feedback controller for the plant. The controller can be any of the controllers previously described (e.g., controller 302, controller 402, controller 502a, etc.) or any other type of controller that provides a control input u to a plant. In some embodiments, the controller is an extremum-seeking controller configured to achieve an optimal value for the performance variable y by adjusting the control input u. The optimal value can be an extremum (e.g., a maximum or a minimum) of the performance variable y.

A plant in control theory is the combination of a process and one or more mechanically-controlled outputs. The plant can be any of the plants previously described (e.g., plant 304, plant 404, plant 504, etc.) or any other controllable system or process. For example, the plant can be an air handling unit configured to control temperature within a building space via one or more mechanically-controlled actuators and/or dampers. In various embodiments, the plant can include a chiller operation process, a damper adjustment process, a mechanical cooling process, a ventilation process, a refrigeration process, or any other process in which a control input u to the plant is adjusted to affect the performance variable y. The performance variable y can be a measured variable observed by one or more sensors of the plant (e.g., a measured temperature, a measured power consumption, a measured flow rate, etc.), a calculated variable based on measured or observed values (e.g., a calculated efficiency, a calculated power consumption, a calculated cost, etc.) or any other type of variable that indicates the performance of the plant in response to the control input u.

Flow diagram 900 is shown to include estimating a normalized correlation coefficient ρ relating the performance variable y to the control input u. The correlation coefficient ρ can be related to the performance gradient $$\frac{dy}{du}\left(\text{e.g., proportional to } \frac{dy}{du}\right)$$

but scaled based on the range of the performance variable y. For example, the correlation coefficient ρ can be a normalized measure of the performance gradient $$\frac{dy}{du}$$

(e.g., scaled to the range 0≤ρ≤1).

In some embodiments, the correlation coefficient ρ can be estimated based on the variance and covariance of the control input u and the performance variable y, as shown in the following equation:

$$\rho = \frac{\text{Cov}(u, y)}{\sqrt{\text{Var}(u)\text{Var}(y)}}$$

where Cov(u, y) is the covariance between the control input u and the performance variable y, Var(u) is the variance of the control input u, and Var(y) is the variance of the performance variable y. The previous equation can be rewritten in terms of the standard deviation $\sigma_u$ of the control input u and the standard deviation $\sigma_y$ of the performance variable y as follows:

$$\rho = \frac{\text{Cov}(u, y)}{\sigma_u \sigma_y}$$

where $\text{Var}(u) = \sigma_u^2$ and $\text{Var}(y) = \sigma_y^2$

In some embodiments, the correlation coefficient ρ is estimated using a recursive estimation technique. The recursive estimation technique may include calculating exponentially-weighted moving averages (EWMAs) of the control input u and the performance variable y. For example, EWMAs of the control input u and the performance variable y can be calculated using the following equations:

$$\overline{u}_k = \overline{u}_{k-1} + \frac{u_k - \overline{u}_{k-1}}{\min(k, W)}$$

where $\overline{u}_k$ and $\overline{y}_k$ are the EWMAs of the control input u and the performance variable y at time k, $\overline{u}_{k-1}$ and $\overline{y}_{k-1}$ are the previous EWMAs of the control input u and the performance variable y at time k−1, $u_k$ and $y_k$ are the current values of the control input u and the performance variable y at time k, k is the total number of samples that have been collected of each variable, and W is the duration of the forgetting window.

EWMAs can also be calculated for the control input variance Var(u), the performance variable variance Var(y), and the covariance Cov(u, y) using the following equations:

$$V_{u,k} = V_{u,k-1} + \frac{(u_k - \overline{u}_k)^2 - V_{u,k-1}}{\min(k, W)}$$

$$V_{y,k} = V_{y,k-1} + \frac{(y_k - \overline{y}_k)^2 - V_{y,k-1}}{\min(k, W)}$$

$$c_k = c_{k-1} + \frac{(y_k - \overline{y}_k)(u_k - \overline{u}_k) - c_{k-1}}{\min(k, W)}$$

where $V_{u,k}$, $V_{y,k}$, and $c_k$ are the EWMAs of the control input variance Var(u), the performance variable variance Var(y), and the covariance Cov(u, y), respectively, at time k. $V_{u,k-1}$, $V_{y,k-1}$, and $c_{k-1}$ are the EWMAs of the control input variance Var (u), the performance variable variance Var(y), and the covariance Cov(u, y), respectively, at time k−1. The correlation coefficient ρ can be estimated based on these recursive estimates using the following equation:

$$\hat{\rho}_k = \frac{c_k}{\sqrt{V_{u,k} V_{y,k}}}$$

In some embodiments, the correlation coefficient ρ is estimated based on the estimated slope $\hat{\beta}$. As previously described, the estimated slope $\hat{\beta}$ can be calculated using the following equation:

$$\hat{\beta} = \frac{\text{Cov}(u, y)}{\text{Var}(u)} = \frac{\text{Cov}(u, y)}{\sigma_u^2}$$

where Cov(u, y) is the covariance between the control input u and the performance variable y, and Var(u) is the variance of the control input u (i.e., $\sigma_u^2$). The correlation coefficient ρ can be calculated from the slope $\hat{\beta}$ using the following equation:

$$\rho = \hat{\beta}\frac{\sigma_u}{\sigma_y}$$

From the previous equation, it can be seen that the correlation coefficient ρ and the estimated slope $\hat{\beta}$ are equal when the standard deviations $\sigma_u$ and $\sigma_y$ are equal (i.e., when $\sigma_u = \sigma_y$).

In some embodiments, the estimated slope $\hat{\beta}$ can be calculated using a set of values for the control input u and the performance variable y. For example, with the assumption of finite variance in u and y, the slope $\hat{\beta}$ can be estimated using the following least squares estimation:

$$\hat{\beta} = \left(\sum_{i=t-N}^{t} u_i u_i^T\right)^{-1} \left(\sum_{i=t-N}^{t} u_i y_i\right)$$

For a small range of the control input u, the estimated slope $\hat{\beta}$ can be used as a proxy for the performance gradient, as shown in the following equation:

$$\hat{\beta} = \frac{dy}{du} = Kf'(u)$$

As shown in the previous equation, the estimated slope $\hat{\beta}$ contains the constant gain K, which may be unknown. However, normalization provided by the standard deviations $\sigma_u$ and $\sigma_y$ cancels the effect of the constant gain K. For example, the standard deviation $\sigma_y$ of the performance variable y is related to the standard deviation $\sigma_u$ of the control input u as shown in the following equations:

$$\sigma_y = K\sigma_u$$

$$\frac{\sigma_u}{\sigma_y} = \frac{1}{K}$$

Multiplying the estimated slope $\hat{\beta}$ by the ratio $$\frac{\sigma_u}{\sigma_y}$$

to calculate the correlation coefficient ρ is equivalent to dividing by the constant gain K. Both the correlation coefficient ρ and the estimated slope $\hat{\beta}$ indicate the strength of the relationship between the control input u and the performance variable y. However, the correlation coefficient ρ has the advantage of being normalized which makes tuning the feedback control loop much simpler.

Still referring to FIG. 9, flow diagram 900 is shown to include driving the estimated correlation coefficient ρ toward zero by modulating an output of a feedback controller (block 908). In some embodiments, the feedback controller is feedback controller 508 shown in FIG. 5. The feedback controller can receive the estimated correlation coefficient ρ as an input and can modulate its output (e.g., DC output w) to drive the estimated correlation coefficient ρ toward zero. The feedback controller can increase or decrease the value of the DC output w until an optimum value for the DC output w is reached. The optimum value of the DC output w can be defined as the value which results in an optimum value (e.g., a maximum or minimum value) of the performance variable y. The optimum value of the performance variable y occurs when the gradient is zero. Accordingly, the feedback controller can achieve the optimum value of the performance variable y by modulating its output w to drive the estimated correlation coefficient ρ to zero.

Flow diagram 900 is shown to include generating an excitation signal (block 910) and generating a new control input u by perturbing the output w of the feedback controller with the excitation signal (block 912). In various embodiments, the excitation signal can be a periodic dither signal v as described with reference to FIGS. 3-4 or a stochastic excitation signal q as described with reference to FIG. 5. The excitation signal can be added to the DC value w generated by the feedback controller to form the new control input u (e.g., u=w+q or u=w+v). After the new control input u is generated, the new control input u can be provided to the plant (block 902) and the ESC control technique can be repeated.

The excitation signal can provide variation in the control input u sufficient to estimate the correlation coefficient ρ in block 906. In some instances, the addition of the excitation signal causes the control input u to drift away from its optimum value. However, the feedback controller can compensate for such drift by adjusting the DC value w such that the control input u is continuously pulled back toward its optimum value. The magnitude of the excitation signal can be selected (e.g., manually by a user or automatically by the controller) to overcome any additive noise found in the performance variable y (e.g., process noise, measurement noise, etc.).

Effect of Performance Variable Noise

Figure 18:
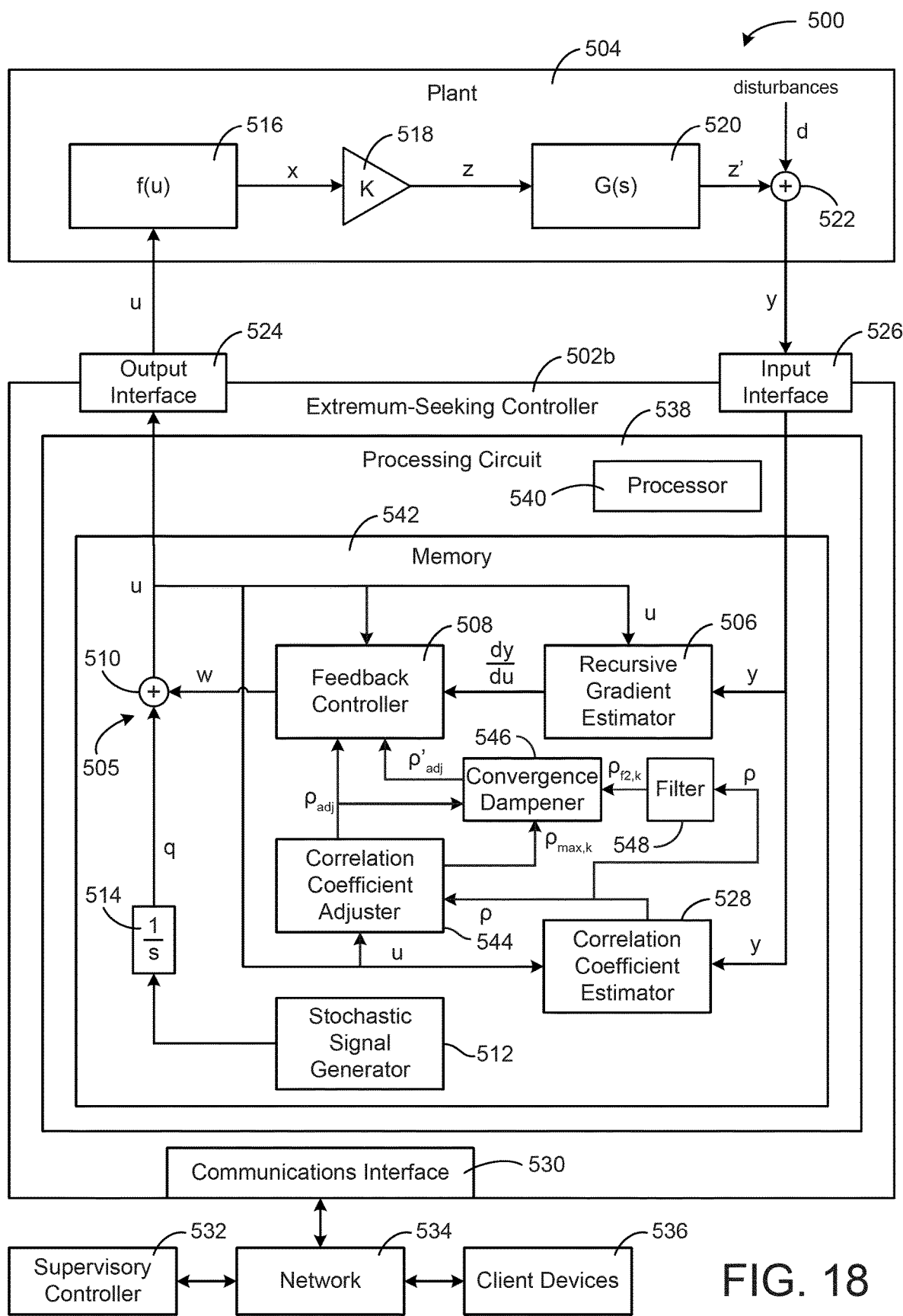
FIG. 18 is a block diagram of the extremum-seeking controller of FIG. 5 configured to account for signal noise and including a correlation coefficient adjuster, according to some embodiments.

Referring now to FIG. 18, extremum-seeking controller 502b is shown, according to some embodiments. Extremum-seeking controller 502b is a modified version of extremum-seeking controller 502a shown to include correlation coefficient adjuster 544, according to some embodiments. In some embodiments, correlation coefficient adjuster 544 is configured to receive the correlation coefficient ρ, determine an adjusted correlation coefficient $\rho_{adj}$ and provide $\rho_{adj}$ to feedback controller 508. In some embodiments, adjusted correlation coefficient $\rho_{adj}$ is determined based on ρ and accounts for noise in a signal associated with performance variable y. It should be understood that while the description of the systems and methods described herein for performing ESC while accounting for signal noise use a correlation coefficient ρ, extremum-seeking controller 502b may also be configured to perform its functionality for an estimate of a gradient G that relates an output (e.g., a performance variable y) of the plant (e.g., plant 504) to an input (e.g., a manipulated variable u) of the plant.

In some embodiments, noise in performance variable y affects the determination of the correlation coefficient ρ. In some embodiments, the correlation coefficient ρ as determined by correlation coefficient estimator 528 decreases as an amount of noise (e.g., a signal to noise ratio) of the performance variable y increases (e.g., signal to noise ratio decreases). In this way, excessive amounts of noise that are present in the signal associated with the performance variable y may adversely affect the determination of the correlation coefficient ρ. In some embodiments, feedback controller 508 uses the correlation coefficient ρ as a feedback variable (FIG. 5). When the correlation coefficient ρ decreases due to noise in performance variable y increasing, convergence speed of feedback controller 508 may also deteriorate (e.g., decrease). In some embodiments, extremum-seeking controller 502a can be manually tuned to ensure that the correlation coefficient ρ is correctly set regardless of noise present in the performance variable y. In some embodiments, extremum-seeking controller 502b includes correlation coefficient adjuster 544 and is configured to automatically account for noise present in the performance variable y. The noise in the performance variable y may cause the correlation coefficient ρ to underrepresent a true correlation between the performance variable y and the control input u. For example, the actual correlation between the performance variable y and the control input u may be higher than represented by the correlation coefficient ρ due to noise present in the signals associated with the performance variable y.

Referring now to FIGS. 10-13, graphs 1000, 1004, 1100, 1104, 1200, 1204, 1300, and 1304 show the effect which noise in a signal associated in the performance variable y may have on the correlation coefficient ρ. The graphs shown in FIGS. 10-13 are based on four simulation test results using extremum-seeking controller 502a with increasing amount of noise $\sigma_e$ in the signal associated with performance variable y, according to some embodiments.

Figure 10:
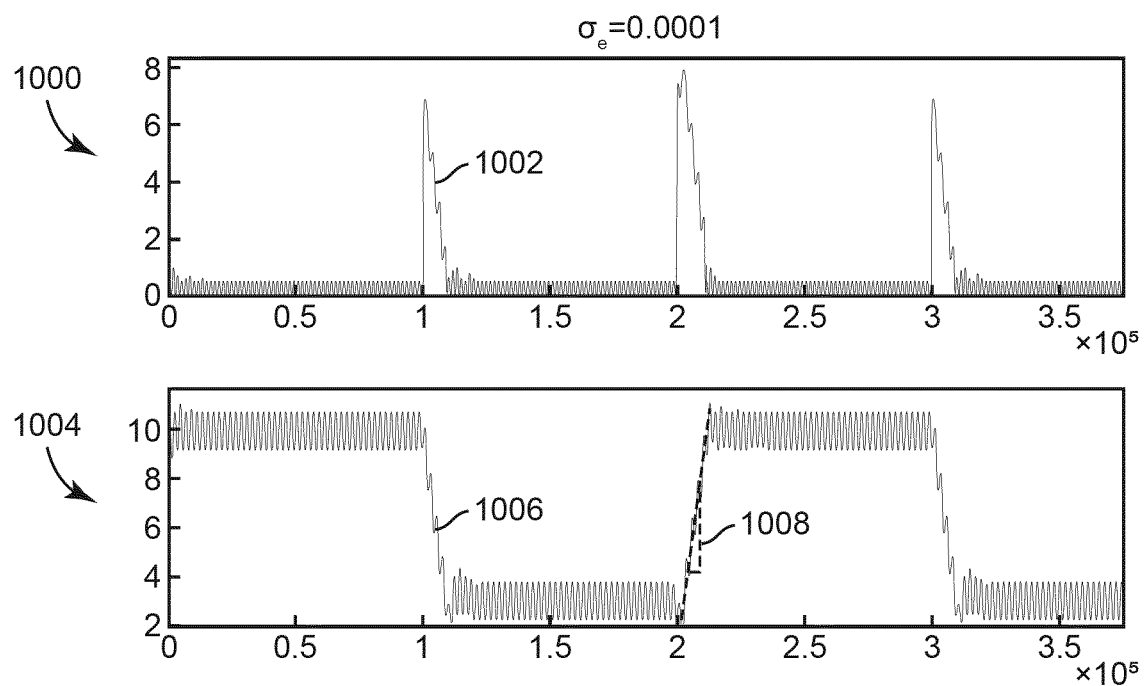
FIG. 10 is a graph of a control variable and a performance variable with a signal associated with the performance variable having a negligible amount of noise, with the control variable being determined using a first ESC method which does not account for signal noise, according to some embodiments.

Referring to FIG. 10, graph 1000 includes series 1002 which illustrates the performance variable y (Y-axis) with respect to a number of samples taken over a time period (X-axis) for negligible noise in the signal associated with performance variable y (i.e., $\sigma_e$=0.0001), according to some embodiments. In some embodiments, graph 1004 includes series 1006 which illustrates the corresponding manipulated variable u (Y-axis) determined by extremum-seeking controller 502a over the same sampling time period (X-axis). As shown in FIG. 10, when noise in a signal associated with the performance variable y is negligible, extremum-seeking controller 502a converges fairly quickly (i.e., convergence rate 1008 is relatively high), according to some embodiments. It should be noted that the optimum value of the manipulated variable u is moved between values of 10 and 3, according to some embodiments. Extremum-seeking controller 502a attempts to move the manipulated variable u to the correct values and minimize the performance variable y to zero, according to some embodiments.

Figure 11:
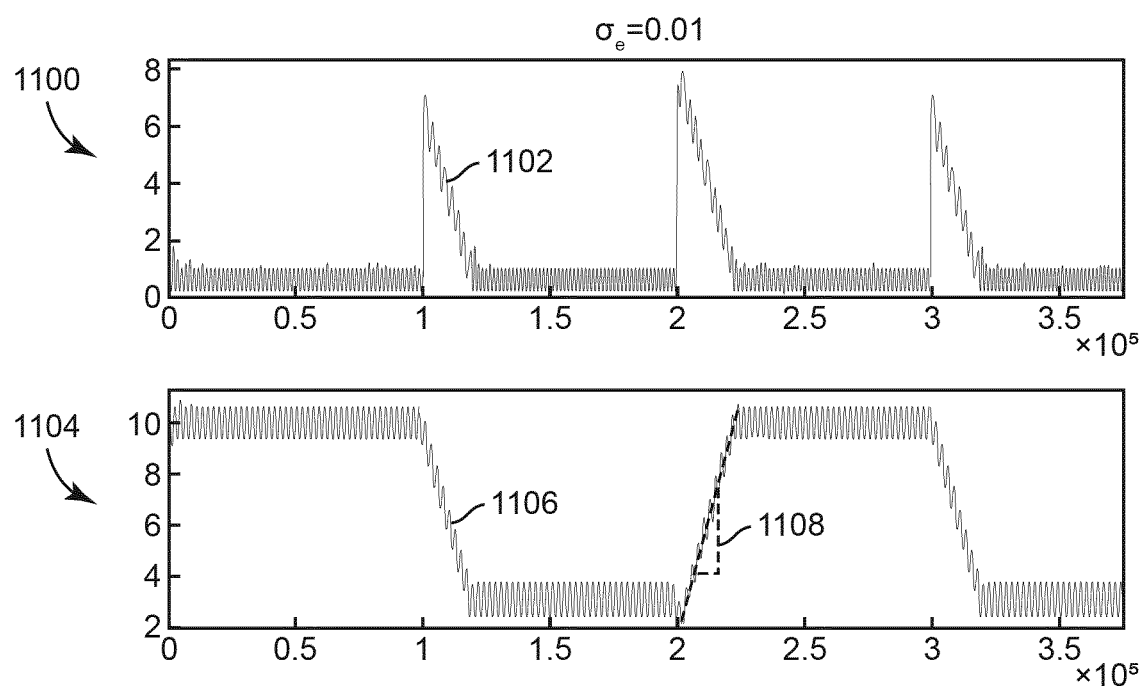
FIG. 11 is a graph of a control variable and a performance variable with a signal associated with the performance variable having a small amount of noise, with the control variable being determined using a first ESC method which does not account for signal noise, according to some embodiments.

Referring now to FIG. 11, graph 1100 includes series 1102 which illustrates the performance variable y (Y-axis) with respect to the same sampling period (X-axis) as graph 1000 for a small amount of noise in the signal associated performance variable y (i.e., σ=0.01), according to some embodiments. Graph 1104 includes series 1106 which illustrates the corresponding manipulated variable u (Y-axis) determined by extremum-seeking controller 502a over the same sampling time period (X-axis), according to some embodiments. As shown in FIG. 11, when the noise in the signal associated with performance variable y has increased to $\sigma_e=0.01$, convergence rate 1108 of the manipulated variable u has decreased compared to convergence rate 1008 for $\sigma_e=0.0001$.

Figure 12:
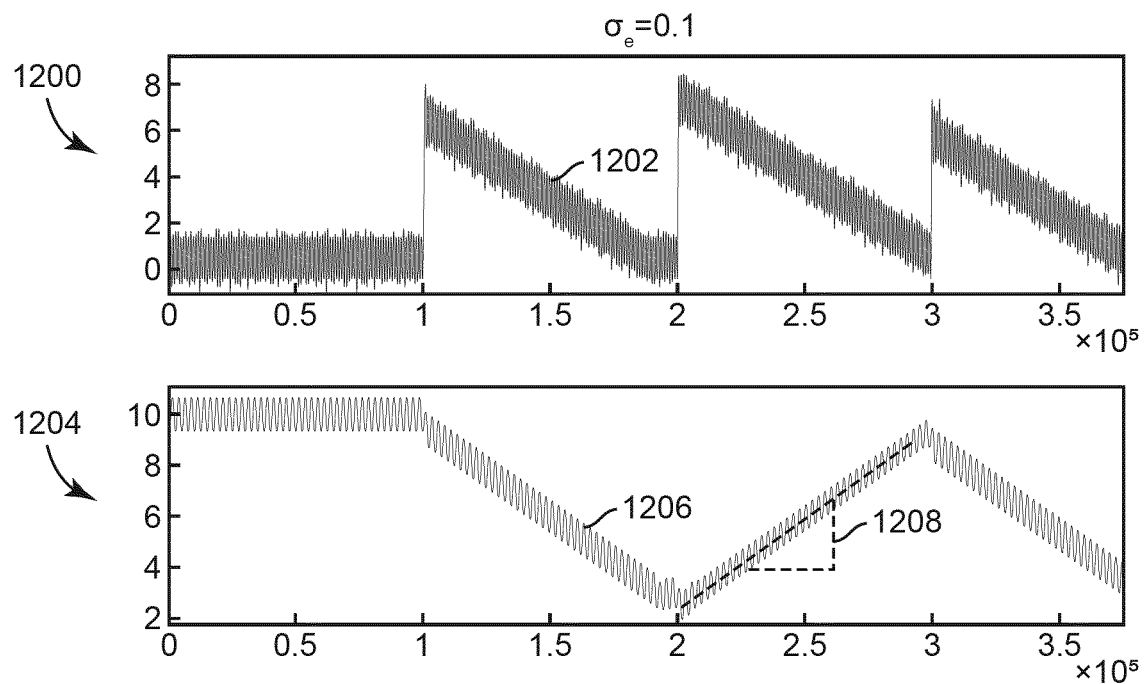
FIG. 12 is a graph of a control variable and a performance variable with a signal associated with the performance variable having a significant amount of noise, with the control variable being determined using a first ESC method which does not account for signal noise, according to some embodiments.

Referring now to FIG. 12, graph 1200 includes series 1202 which illustrates the performance variable y (Y-axis) with respect to the same sampling period (X-axis) as graph 1000 for a relatively high amount of noise (i.e., $\sigma_e=0.1$), according to some embodiments. Graph 1204 includes series 1206 which illustrates the corresponding manipulated variable u (Y-axis) determined by extremum seeking-controller 502a over the same sampling time period (X-axis), according to some embodiments. As shown in FIG. 12, when the noise in the signal associated with performance variable y has increased to $\sigma_e=0.1$, convergence rate 1208 of the manipulated variable u has decreased further compared to convergence rates 1008 and 1108.

Figure 13:
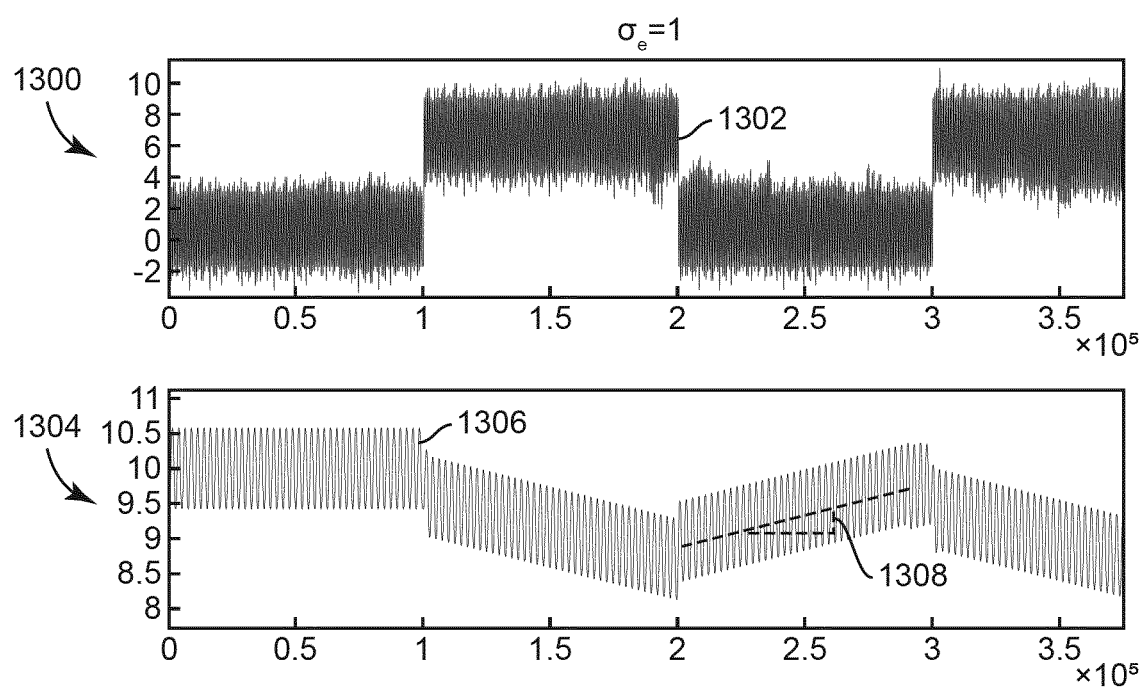
FIG. 13 is a graph of a control variable and a performance variable with a signal associated with the performance variable having a large amount of noise, with the control variable being determined using a first ESC method which does not account for signal noise, according to some embodiments.
Figure 14:
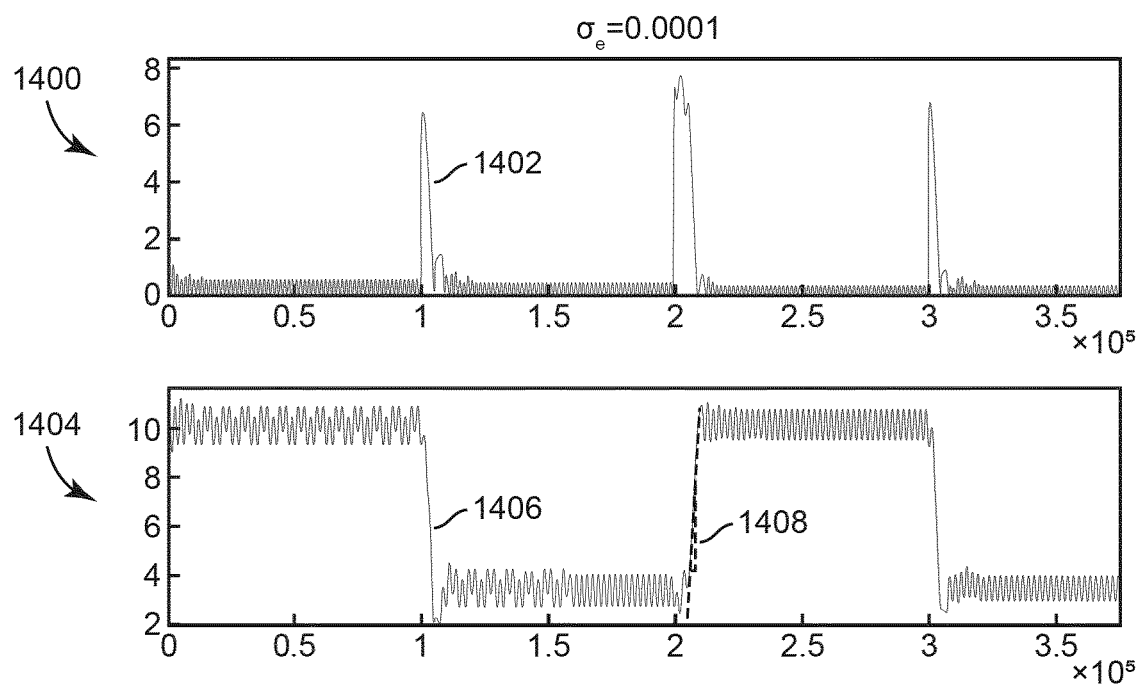
FIG. 14 is a graph of a control variable and a performance variable with a signal associated with the performance variable having a negligible amount of noise, with the control variable being determined using a second ESC method which accounts for signal noise, according to some embodiments.
Figure 15:
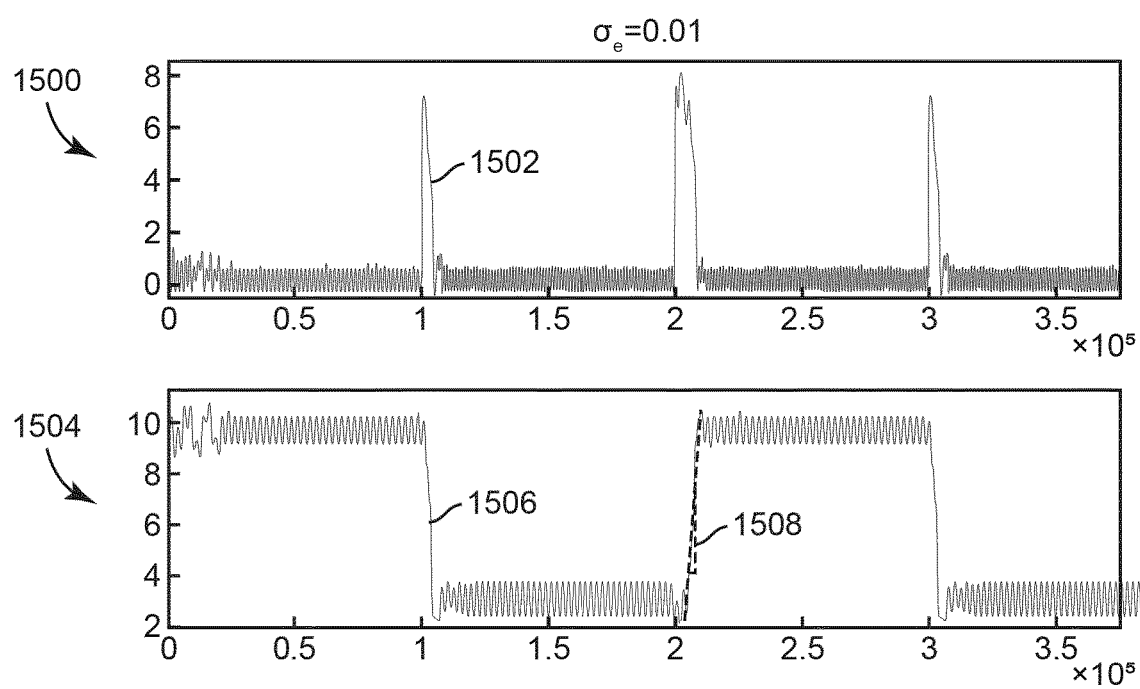
FIG. 15 is a graph of a control variable and a performance variable with a signal associated with the performance variable having a small amount of noise, with the control variable being determined using a second ESC method which accounts, according to some embodiments.
Figure 16:
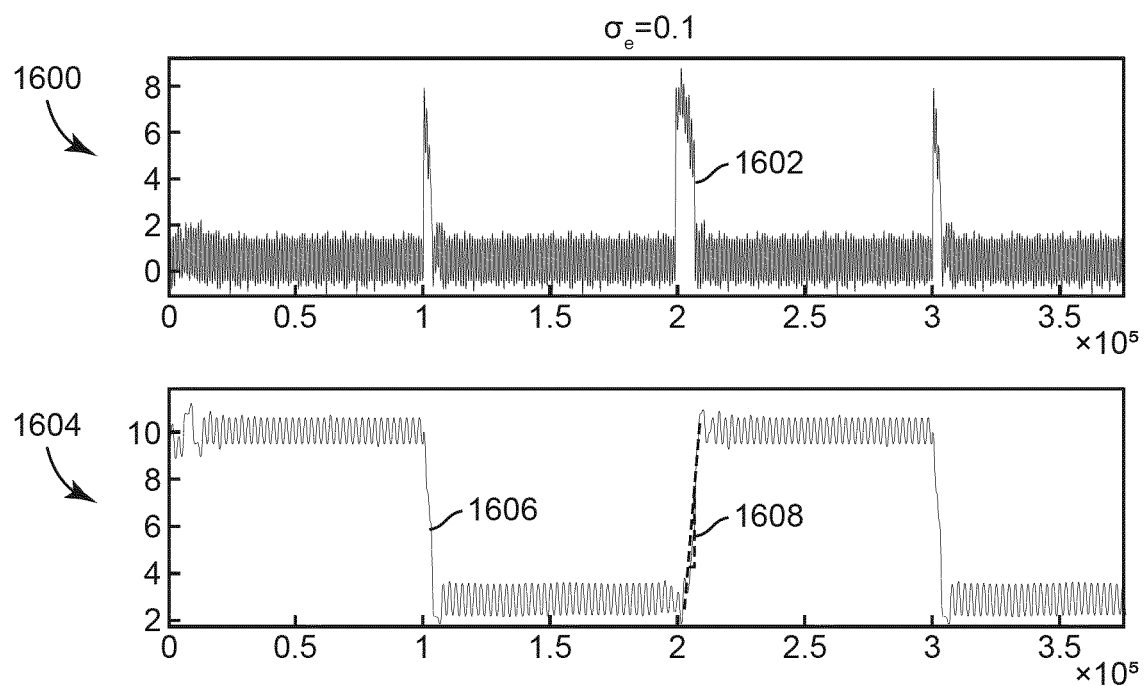
FIG. 16 is a graph of a control variable and a performance variable with a signal associated with the performance variable having a significant amount of noise, with the control variable being determined using a second ESC method which accounts, according to some embodiments.
Figure 17:
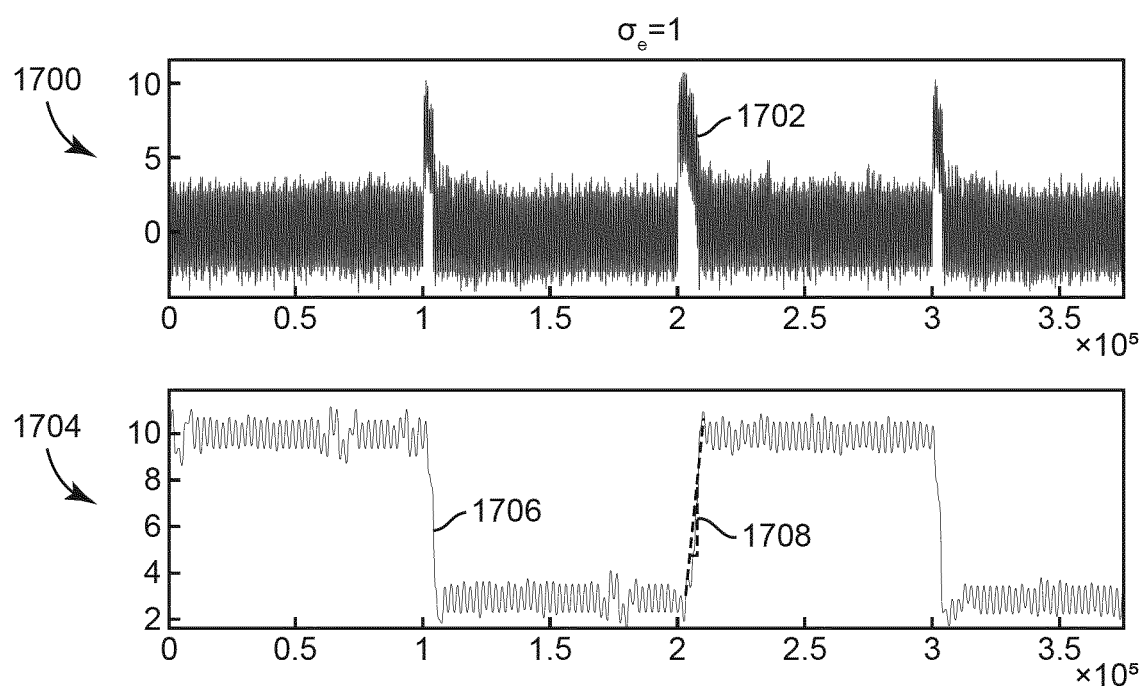
FIG. 17 is a graph of a control variable and a performance variable with a signal associated with the performance variable having a large amount of noise, with the control variable being determined using a second ESC method which accounts, according to some embodiments.

Referring now to FIG. 13, graph 1300 includes series 1302 which illustrates the performance variable y (Y-axis) with respect to the same sampling period (X-axis) as graph 1000 for a very high amount of noise (i.e., $\sigma_e=1$), according to some embodiments. Graph 1304 includes series 1206 which illustrates the corresponding manipulated variable u (Y-axis) determined by extremum seeking-controller 502a over the same sampling time period (X-axis), according to some embodiments. As shown in FIG. 13, when the noise in the signal associated with performance variable y has increased to $\sigma_e=1$, convergence rate 1308 has decreased to a value which can be seen to be less than 1, according to some embodiments. Convergence rate 1308 is less than convergence rates 1208, 1108, and 1008, according to some embodiments.

FIGS. 10-13 illustrate the impact that increasing $\sigma_e$ has upon the convergence rate of manipulated variable u, according to some embodiments. In some embodiments, extremum-seeking controller 502b includes correlation coefficient adjuster 544 configured to determine an adjusted correlation coefficient $\rho_{adj}$ so that the convergence rate of manipulated variable u is not sensitive to an amount of noise $\sigma_e$ present in the signals associated with the performance variable y. In this way, the convergence rate of manipulated variable u can be maintained at a relatively high value, even with increasing noise in the signals associated with the performance variable y. Noise may be introduced by disturbances, measurement error, system jitter, etc. FIGS. 5 and 18 show the noise introduced to the performance variable y as disturbance d at summing junction 522.

Extremum-Seeking Controller with Correlation Coefficient Adjuster

Figure 19:
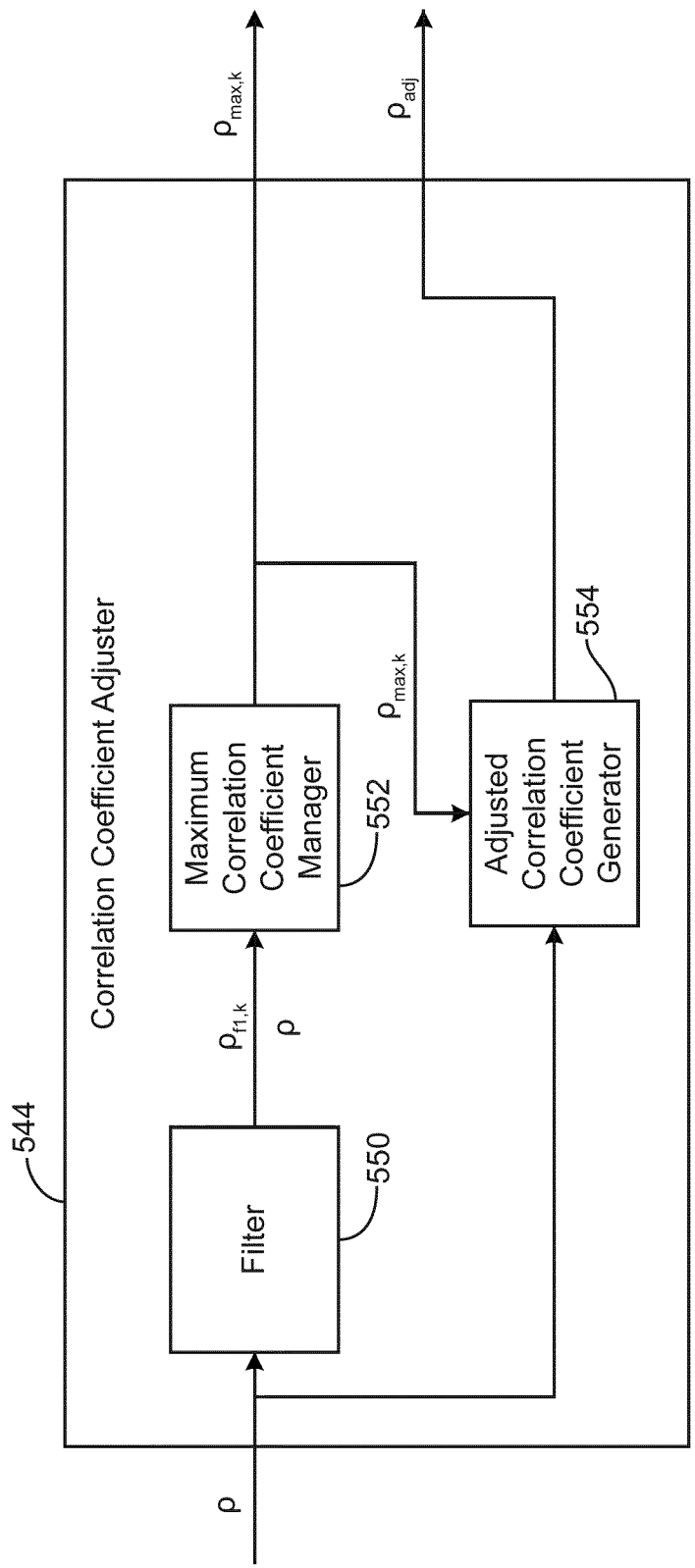
FIG. 19 is a block diagram of the correlation coefficient adjuster of the extremum-seeking controller of FIG. 18, according to some embodiments.

Referring now to FIGS. 18-19, extremum-seeking controller 502b is shown in detail, according to some embodiments. Extremum-seeking controller 502b includes correlation coefficient adjuster 544, configured to determine an adjusted correlation coefficient $\rho_{adj}$ such that the convergence rate of the manipulated variable u does not decrease with respect to increasing $\sigma_e$ as shown in FIGS. 10-13 above. Extremum-seeking controller 502b includes filter 548 and convergence dampener 546, according to some embodiments. Correlation coefficient adjuster 544 receives $\rho$ from correlation coefficient estimator 528, and passes $\rho$ through a filter to determine a filtered value of $\rho$ (i.e., $\rho_{f1,k}$). In some embodiments, filter 550 provides $\rho_{f1,k}$ to maximum correlation coefficient manager 552 which is configured to determine, estimate, calculate, obtain, etc., a maximum value of the filtered correlation coefficient, $\rho_{max,k}$. In some embodiments, adjusted correlation coefficient generator 554 receives both $\rho$ and $\rho_{max,k}$ and determines an adjusted correlation coefficient $\rho_{adj}$. In some embodiments, $\rho_{adj}$ is provided to convergence dampener 546 and/or feedback controller 508. In some embodiments, extremum-seeking controller 502b uses any of the functionality, techniques, and/or is implemented in any of the examples described in U.S. application Ser. No. 15/080,435, filed Mar. 24, 2016, the entirety of which is incorporated by reference herein.

In some embodiments, correlation coefficient estimator 528 provides $\rho$ to filter 548. In some embodiments, filter 548 filters $\rho$ to determine a filtered version of the correlation coefficient $\rho_{f2}$ and provides $\rho_{f2}$ to convergence dampener 546. In some embodiments, convergence dampener 546 determines a scaled version of $\rho_{adj}$, shown as $\rho_{adj}'$, and provides the scaled and adjusted correlation coefficient $\rho_{adj}'$ to feedback controller 508.

In some embodiments, the correlation coefficient $\rho$ between two signals x (e.g., the signal associated with manipulated variable u) and $y_0$ (e.g., a noise-less signal associated with performance variable y) can be determined as shown below:

$$\rho_{x,y}^2 = \frac{\sigma_{xy_0}^2}{\sigma_x^2 \sigma_{y_0}^2}$$

where $\rho_{x,y_0}$ is the correlation coefficient between signals x and $y_0$, $\sigma_{xy_0}$ is the covariance between signal x and signal $y_0$, $\sigma_x^2$ is the variance of signal x, and $\sigma_{y_0}^2$ is the variance of signal $y_0$. In some embodiments, $\rho_{x,y_0}$ is $\rho$ as determined by correlation coefficient estimator 528. In some embodiments, correlation coefficient estimator 528 uses the above equation to determine $\rho$. In some embodiments, the equation above assumes that the signal associated with performance variable y does not have noise associated with it.

In some embodiments, the signal associated with the performance variable y has noise associated with it. When noise is present, the signal $y_0$ (e.g., the noiseless signal associated with the performance variable y) is combined with a noise signal e such that $\sigma_y^2 = \sigma_{y_0}^2 + \sigma_e^2$, according to some embodiments. In some embodiments, the correlation coefficient $\rho$ between signals x and y (e.g., noisy signal associated with the performance variable y) can be determined as:

$$\rho_{x,y}^2 = \frac{\sigma_{xy}^2}{\sigma_x^2 \sigma_y^2} = \frac{\sigma_{xy}^2}{\sigma_x^2 (\sigma_{y_0}^2 + \sigma_e^2)}$$

where $\sigma_e^2$ is a variance of signal y due to noise, and y is a signal associated with the performance variable y which includes variation due to noise (e.g., signal e), according to some embodiments.

In some embodiments, correlation coefficient estimator 528 uses $$\frac{\sigma_{xy}^2}{\sigma_x^2 \sigma_y^2}$$

to determine $\rho^2$ without taking into account $\sigma_e^2$, where $\sigma_{xy}$ is covariance between the signal x associated with the control variable u, $\sigma_x^2$ is the variance of the signal associated with the manipulated variable u, and $\sigma_y^2$ is the variance of the signal associated with the performance variable y.

Since an error or noise signal, e, is an independent signal uncorrelated with signals x or y, $\sigma_{xy}^2 = \sigma_{xy_0}^2$, according to some embodiments. Since $\sigma_{xy}^2 = \sigma_{xy_0}^2$, it follows that:

$$\rho_{x,y}^2 = \rho_{x,y_0}^2 \left( \frac{1}{1 + \frac{\sigma_e^2}{\sigma_{y_0}^2}} \right)$$

or:

$$\rho_{x,y}^2 = \rho_{x,y_0}^2 \left( \frac{1}{1 + \frac{\sigma_e^2}{\sigma_y^2 - \sigma_e^2}} \right)$$

according to some embodiments. From the equation above, it can be seen that the correlation coefficient $\rho_{x,y_0}$ between two signals (e.g., x and y) decreases with an increase in noise (e.g., as $\sigma_e$ increases), according to some embodiments. For extremum-seeking controller 502a which uses the correlation coefficient $\rho$ as a feedback variable, a reduce in magnitude of the correlation coefficient $\rho$ results in reducing feedback gain $\kappa$, according to some embodiments. In some embodiments, a lower feedback gain $\kappa$ correspondingly leads to a slower convergence or a decreased convergence rate as shown in FIGS. 10-13.

Various approaches can be adopted to counteract the effect of $\sigma_e^2$, according to some embodiments. One approach is to use an estimate of the noise-free correlation coefficient $\rho$ by solving the above equation for $\rho_{x,y_0}^2$, according to some embodiments. In some embodiments, this requires knowledge of the noise variance $\sigma_e^2$.

Another approach to counteract the effect of $\sigma_e^2$ is described hereinbelow, according to some embodiments. In some embodiments, correlation coefficient adjuster 544 is configured to receive $\rho$ as determined by correlation coefficient estimator 528 and determine $\rho_{adj}$.

Since the correlation coefficient $\rho_{xy_0}$ is a normalized value, it can be assumed that a maximum value of $\rho_{xy_0}^2$ is equal to one, shown below:

$$\max(\rho_{x,y_0}^2) = 1$$

according to some embodiments. The maximum value of $\rho_{xy}^2$ can be observed and the ratio of this maximum value can be used to estimate $\sigma_e^2$:

$$\frac{\max(\rho_{x,y}^2)}{\max(\rho_{x,y_0}^2)} = \left( \frac{1}{1 + \frac{\sigma_e^2}{\sigma_y^2 - \sigma_e^2}} \right)$$

$$\frac{\max(\rho_{x,y}^2)}{1} = \left( \frac{1}{1 + \frac{\sigma_e^2}{\sigma_y^2 - \sigma_e^2}} \right)$$

since the only unknown value in the equation above is $\sigma_e^2$.

In some embodiments, due to variance in sample estimation of $\rho_{x,y}^2$, tracking the maximum value of $\rho_{x,y}^2$ would lead to an inflated value of $\rho_{x,y}^2$ which may underestimate the effect of $\sigma_e^2$. In some embodiments, mitigating measures may be taken to account for the variance in the estimation of $\rho_{x,y}^2$. In some embodiments, $\rho_{x,y}^2$ (i.e., $\varphi$ is received by correlation coefficient adjuster 544 from correlation coefficient estimator 528 and is filtered with filter 550. In some embodiments, filter 550 uses a first order filter shown below to determine a filtered correlation coefficient:

$$\rho_{f1,k}^2 = \rho_{f1,k-1}^2 + \lambda(\rho_{x,y}^2 - \rho_{f1,k-1}^2)$$

where $\lambda$ is a forgetting factor, $\rho_{f1,k}$ is a filtered correlation coefficient at time step k, and $\rho_{f1,k}$ is the filtered correlation coefficient at a previous time step k-1. In some embodiments, the maximum value of $\rho_{f1,k}^2$ over a time period can be recorded (e.g., selected) by maximum correlation coefficient manager 552 and used to rescale $\rho_{x,y}^2$ (the correlation coefficient determined based on the noisy performance variable y signal). However, remaining sample variance in $\rho_{f1,k}$ may cause the maximum value of $\rho_{f1,k}$ to increase over time, according to some embodiments. In some embodiments, filter 550 is optional. For example, maximum correlation coefficient manager 552 may receive the correlation coefficient $\rho$ from correlation coefficient estimator 528 and perform its respective functions using values of the correlation coefficient $\rho$.

In some embodiments, maximum correlation coefficient manager 552 is configured to allow the maximum value of $\rho_{f1,k}^2$ to decay over time using the equation:

$$\rho_{max,k}^2 = \max(\rho_{max,k-1}^2 (1-\lambda), \rho_{f1,k}^2)$$

where $\rho_{max,k}^2$ is a filtered maximum value at time step k, $\rho_{f1,k}^2$ is the filtered squared correlation coefficient at time step k, $\rho_{max,k-1}^2$ is a filtered maximum value at a previous time step k-1, and $\lambda$ is a forgetting factor. In this way, $\rho_{max,k}^2$ is prevented from becoming stuck or stagnating at a maximum value, according to some embodiments. In some embodiments, $\rho_{max,k}^2$ decays over time, and if a present value of $\rho_{f1,k}^2$ does not exceed the previous maximum value multiplied by some amount (e.g., $(1-\lambda)$), the new $\rho_{max,k}^2$ value is $\rho_{max,k-1}^2(1-\lambda)$. Allowing $\rho_{max,k}^2$ to diminish or decay over time ensures that the noise adjustment does not become saturated and inactive, according to some embodiments. In some embodiments, this is advantageous for applications when the noise changes over time. In some embodiments, if the noise increases, the expected maximum value of $\rho^2$ would decrease. In this way, $\rho_{max}^2$ is allowed to be reset to lower values, according to some embodiments.

In some embodiments, adjusted correlation coefficient generator 554 is configured to receive the correlation coefficient $\rho_{x,y}$ from correlation coefficient estimator 528, and the maximum correlation coefficient at time step k (i.e., $\rho_{max,k}$) from maximum correlation coefficient manager 552 to determine an adjusted $\rho$ value (e.g., an adjusted $\rho_{xy}$) using the equation shown below:

$$\rho_{adj} = \frac{\rho_{x,y}}{\sqrt{\rho_{max,k}^2}} = \frac{\rho_{x,y}}{\rho_{max,k}}$$

where $\rho_{adj}$ is the adjusted correlation coefficient, $\rho_{max,k}$ is the maximum correlation coefficient value at time step k, and $\rho_{x,y}$ is the correlation coefficient at time step k. In some embodiments, $\rho_{x,y}$ is $\rho$ as determined by correlation coefficient estimator 528.

It should be noted that $\rho_{adj}$ is not constrained within the range −1 to 1, according to some embodiments. In some embodiments, since $\rho_{adj}$ is not constrained within the range −1 to 1 (e.g., is not normalized), $\rho_{adj}$ does not indicate a degree of correlation between two signals, but rather is a feedback variable to be used by feedback controller 508.

In some embodiments, feedback controller 508 is an integrator which uses $\rho_{adj}$ as a feedback variable. In some embodiments, feedback controller 508 is configured to receive the adjusted correlation coefficient from correlation coefficient adjuster 544 and use $\rho_{adj}$ to determine a current value of the manipulated variable u using the equation:

$$u_k = u_{k-1} - \kappa \rho_{adj}$$

where $u_k$ is the manipulated variable u at a present time k, $u_{k-1}$ is a value of the manipulated variable u at a time k−1, K is the feedback/controller gain, and $\rho_{adj}$ is the adjusted correlation coefficient.

Substituting the $\rho_{adj}$ equation into the equation above yields:

$$u_k = u_{k-1} - \kappa \left( \frac{\rho_{x,y}}{\sqrt{\rho_{max,k}^2}} \right)$$

according to some embodiments. In some embodiments, feedback controller 508 is configured to directly receive $\rho_{x,y}$ from correlation coefficient estimator 528, and directly receive $\rho_{max,k}$ from maximum correlation coefficient manager 552 and uses the above equation to determine $u_k$.

In some embodiments, feedback controller 508 uses a scaled adjusted correlation coefficient $\rho_{adj}'$. In some embodiments, feedback controller 508 receives $\rho_{adj}'$ from convergence dampener 546.

Filter 548 is configured to receive $\rho_{x,y}$ from correlation coefficient estimator 528, according to some embodiments. In some embodiments, filter 548 is configured to determine a filtered version of $\rho_{x,y}$ using the equation:

$$\rho_{f2,k} = \rho_{f2,k-1} + \lambda(\rho_{x,y} - \rho_{f2,k-1})$$

where $\rho_{f2,k}$ is a filtered value of $\rho_{x,y}$ at time k, $\rho_{f2,k-1}$ is the filtered value of $\rho_{x,y}$ at a previous time k−1, and λ is a forgetting factor.

In some embodiments, filter 548 determines $\rho_{f2,k}$ and provides $\rho_{f2,k}$ to convergence dampener 546. In some embodiments, convergence dampener 546 is configured to determine a scaled value of $\rho_{adj}$ (i.e., $\rho_{adj}'$) to dampen sensitivity of the integration when feedback controller 508 converges to an optimum u value and ρ approaches zero. In some embodiments, convergence dampener 546 determines $\rho_{adj}'$ using the equation:

$$\rho_{adj}' = \rho_{adj} \left( \frac{|\rho_{f2,k}|}{\sqrt{\rho_{max,k}^2}} \right)$$

or:

$$\rho_{adj}' = \rho_{adj} \left( \frac{\rho_{f2,k}}{\sqrt{\rho_{max,k}^2}} \right)$$

where $\rho_{f2,k}$ is the filtered value of $\rho_{x,y}$ as determined by filter 548, $\rho_{max,k}$ is the maximum correlation coefficient determined by maximum correlation coefficient manager 552 and $\rho_{adj}$ is the adjusted correlation coefficient determined by adjusted correlation coefficient generator 554 and/or correlation coefficient adjuster 544.

It should also be noted that the $\rho_{adj}'$ is also normalized by $\rho_{max,k}$ in the equation above in order to keep the scaling consistent for different noise levels, according to some embodiments. Feedback controller 508 uses $\rho_{adj}'$ to determine a current value at time k of the manipulated variable u using the equation:

$$u_k = u_{k-1} - \kappa \rho_{adj}'$$

according to some embodiments. In some embodiments, convergence dampener 546 and/or filter 548 are optional. For example, feedback controller 508 may use the adjusted correlation coefficient $\rho_{adj}$ and perform its functionality using the adjusted correlation coefficient $\rho_{adj}$. In some embodiments, filter 548 is optional and convergence dampener 546 uses values of the correlation coefficient ρ to perform its functionality instead of $\rho_{f2,k}$.

In some embodiments, feedback controller 508 receives $\rho_{x,y}$ directly from correlation coefficient estimator 528, $\rho_{f2,k}$ directly from filter 548, and $\rho_{max,k}$ directly from maximum correlation coefficient manager 552 and uses the equation:

$$u_k = u_{k-1} - \kappa \left( \frac{\rho_{x,y} |\rho_{f2,k}|}{\rho_{max,k}} \right)$$

or:

$$u_k = u_{k-1} - \kappa \left( \frac{\rho_{x,y} \rho_{f2,k}}{\rho_{max,k}} \right)$$

to determine $u_k$ to the ESC. When feedback controller 508 converges, the expected value of ρ (e.g., $\rho_{x,y}$) as determined by correlation coefficient estimator 528 approaches zero, causing the integration to be less sensitive to changes in $\rho_{x,y}$, according to some embodiments.

The controller/feedback K is determined by feedback controller 508 using a dominant time constant of plant 504 that may be calculated using the equation:

$$\kappa = \frac{\Delta t}{10\tau}$$

where Δt is a time step, and τ is the dominant (e.g., largest) time constant of plant 504, according to some embodiments.

The forgetting factor λ is determined (e.g., by feedback controller 508) based on the dominant time constant of plant 504 as well, using the equation:

$$\lambda = \frac{\Delta t}{5\tau}$$

according to some embodiments.

Example Graphs

Referring now to FIGS. 14-17, graphs 1400, 1404, 1500, 1504, 1600, 1604, 1700, and 1704 are shown, according to some embodiments. In some embodiments, the graphs shown in FIGS. 14-17 are the same as the graphs as shown in FIGS. 10-13, but using extremum-seeking controller 502*b* instead of extremum-seeking controller 502*a*. For example, graphs 1400 and 1404 show series 1402 and 1406 of the performance variable y and the manipulated variable u, respectively, for noise $\sigma_e=0.0001$, according to some embodiments. Graphs 1500 and 1504 show series 1502 and 1506 of the performance variable y and the manipulated variable u, respectively, for noise $\sigma_e=0.01$, according to some embodiments. Graphs 1600 and 1604 show series 1602 and 1606 of the performance variable y and the manipulated variable u, respectively, for noise $\sigma_e=0.1$, according to some embodiments. Graphs 1700 and 1704 show series 1702 and 1706 of the performance variable y and the manipulated variable u, respectively, for noise $\sigma_e=1$, according to some embodiments. As shown in FIGS. 14-17, the convergence rates (i.e., convergence rate 1408, convergence rate 1508, convergence rate 1608, and convergence rate 1708) stay relatively the same despite the noise $\sigma_e$ increasing by four orders of magnitude. Advantageously, extremum-seeking controller 502b can be used to perform ESC, regardless of noise present in the signal associated with the performance variable y. Additionally, extremum-seeking controller 502b uses the normalized/scaled adjusted correlation coefficient $\rho_{adj}'$, thereby reducing the need for tuning, and facilitating ESC for a plant, regardless of scale of u or y, according to some embodiments.

Noise-Adaptive Extremum-Seeking Control Process

Figure 20:
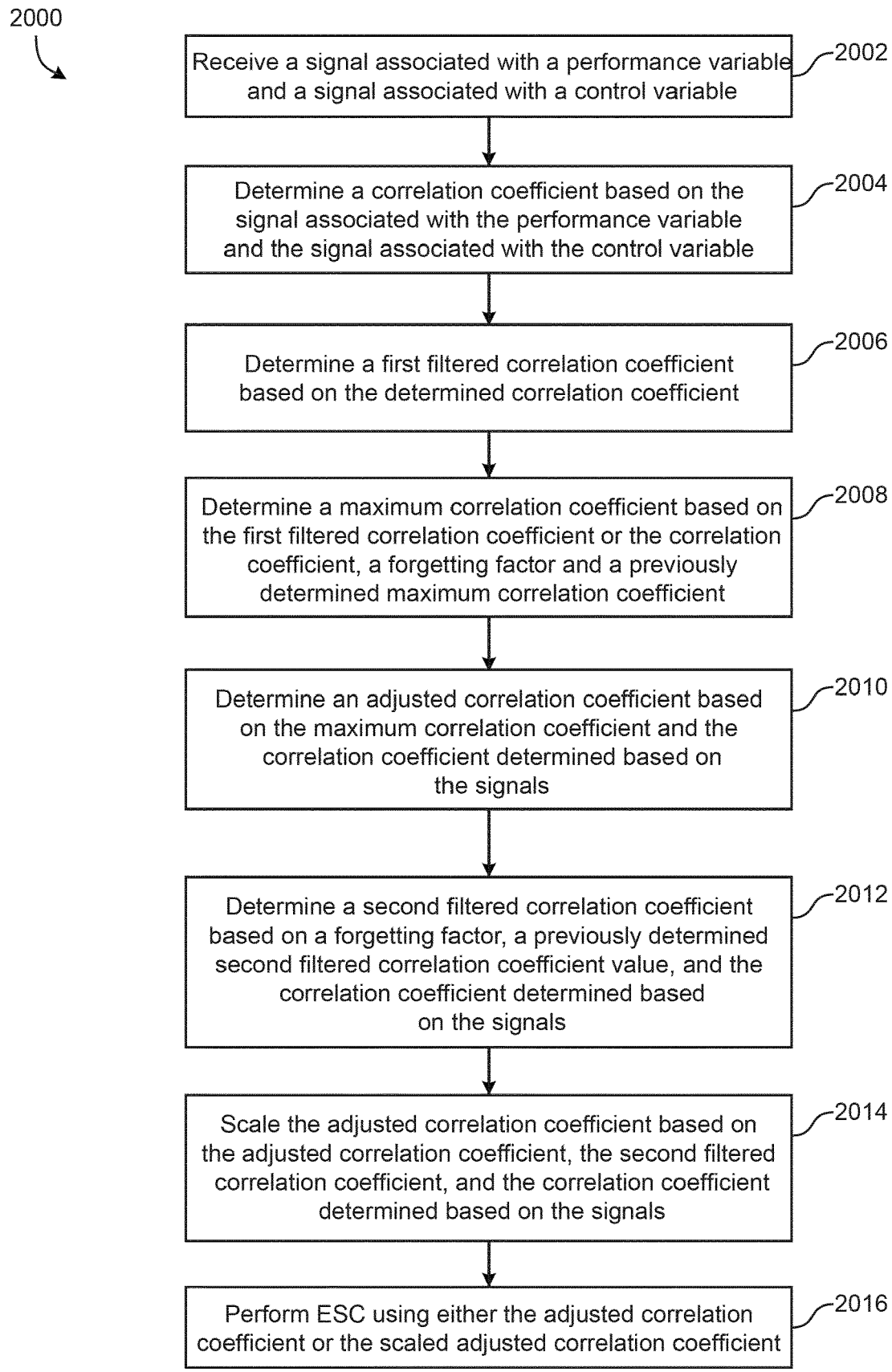
FIG. 20 is a method for determining a scaled adjusted correlation coefficient to perform ESC and account for signal noise, according to some embodiments.

Referring now to FIG. 20, a process 2000 for performing ESC despite a potentially noisy performance variable signal is shown, according to some embodiments. In some embodiments, process 2000 is performed by extremum-seeking controller 502b, or components of extremum-seeking controller 502b. Process 2000 advantageously facilitates performing ESC using a normalized correlation coefficient that is independent of scale of a plant, and accounts for noise present in a signal associated with the performance variable of the plant.

Process 2000 includes receiving a signal associated with a performance variable and a signal associated with a control variable (step 2002), according to some embodiments. In some embodiments, the signal associated with the performance variable and the signal associated with the control variable are received by extremum-seeking controller 502b. In some embodiments, the signal associated with the performance variable and the signal associated with the control variable are received by correlation coefficient estimator 528. In some embodiments, the performance variable is a performance variable of a plant. In some embodiments, the control variable is a control variable of the plant.

Process 2000 includes determining a correlation coefficient based on the signal associated with the performance variable and the signal associated with the control variable (step 2004), according to some embodiments. In some embodiments, step 2004 includes determining the correlation coefficient $\rho$. In some embodiments, step 2004 is performed by correlation coefficient estimator 528.

Process 2000 includes determining a first filtered correlation coefficient based on the determined correlation coefficient (step 2006), according to some embodiments. In some embodiments, the first filtered correlation coefficient is $\rho_{fl,k}$. In some embodiments, the first filtered correlation coefficient is determined by correlation coefficient adjuster 544. In some embodiments, the first filtered correlation coefficient is determined by filter 550. In some embodiments, step 2006 includes using a first order filter.

Process 2000 includes determining a maximum correlation coefficient based on the first filtered correlation coefficient, a forgetting factor, and a previously determined maximum correlation coefficient (step 2008), according to some embodiments. In some embodiment, step 2008 is performed by maximum correlation coefficient manager 552. In some embodiments, the forgetting factor is $\lambda$. In some embodiments, the forgetting factor $\lambda$ is determined based on a time step and a maximum time constant $\tau$ of the plant. In some embodiments, the maximum correlation coefficient is $\rho_{max,k}$. In some embodiments, step 2008 is performed by maximum correlation coefficient manager 552 using outputs of filter 550 (i.e., $\rho_{fl,k}$). In some embodiments, step 2008 is performed by maximum correlation coefficient manager 552 using the outputs of correlation coefficient estimator 528 (i.e., $\rho$).

Process 2000 includes determining an adjusted correlation coefficient based on the maximum correlation coefficient, and the correlation coefficient determined based on the signals associated with the control variable and the performance variable (step 2010), according to some embodiments. In some embodiments, step 2010 is performed by correlation coefficient adjuster 544. In some embodiments, step 2010 is performed by adjusted correlation coefficient generator 554.

Process 2000 includes determining a second filtered correlation coefficient based on a forgetting factor, a previously determined second filtered correlation coefficient value, and the correlation coefficient determined based on the signals associated with the control variable and the performance variable (step 2012), according to some embodiments. In some embodiments, step 2012 is performed by filter 548. In some embodiments, the forgetting factor of step 2012 is the forgetting factor of step 2008.

Process 2000 includes scaling (e.g., normalizing) the adjusted correlation coefficient based on the adjusted correlation coefficient, the second filtered correlation coefficient, and the correlation coefficient determined based on the signals associated with the control variable and the performance variable (step 2014), according to some embodiments. In some embodiments, step 2014 is performed by convergence dampener 546. In some embodiments, step 2014 results in a decreased sensitivity to changes in the correlation coefficient determined based on the signals associated with the control variable and the performance variable when the ESC is converging. In some embodiments, step 2014 determines $\rho_{adj}'$. In some embodiments, step 2014 is performed by feedback controller 508.

Process 2000 includes performing ESC using either the adjusted correlation coefficient (determined in step 2010) or using the scaled adjusted correlation coefficient (step 2016), according to some embodiments. In some embodiments, step 2016 includes using either the adjusted correlation coefficient or the scaled adjusted correlation coefficient to perform ESC in addition to using a controller gain value. In some embodiments, the controller gain value is K. In some embodiments, K is determined based on a time step and a maximum/dominant time constant of the plant.

Advantageously, process 2000 can be performed for implementing ESC even when a signal associated with the performance variable is noisy. Using process 2000 facilitates a rapid convergence even when the signal associated with the performance variable increases. Other ESC systems do not necessarily account for or mitigate the noise in the signal associated with the performance variable, and the convergence rate of such ESC systems may be adversely affected by the noisy signal.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for performing extremum-seeking control of a plant, the method comprising:
   determining a plurality of values of a correlation coefficient that relates a control input provided as an input to the plant to a performance variable that characterizes a performance of the plant in response to the control input, the performance variable comprising a noise-free portion and an amount of noise;
   determining an adjusted correlation coefficient by scaling a first value of the correlation coefficient selected from the plurality of values relative to a second value of the correlation coefficient selected from the plurality of values, the adjusted correlation coefficient relating the noise-free portion of the performance variable to the control input; and
   operating equipment of the plant by using the adjusted correlation coefficient to modulate the control input provided as an input to the equipment of the plant;
   wherein:
       the amount of noise in the performance variable causes the first value of the correlation coefficient to under-represent a true correlation between the performance variable and the control input; and
       the adjusted correlation coefficient reduces an impact of the amount of noise in the performance variable and more accurately represents the true correlation relative to the first value of the correlation coefficient.

2. The method of claim 1, wherein the first value of the correlation coefficient is determined based on a covariance of the control input and the performance variable, a variance of the control input, and a variance of the performance variable.

3. The method of claim 1, wherein the second value of the correlation coefficient is determined based on a first filtered value of a plurality of estimated values of the correlation coefficient and a forgetting factor.

4. The method of claim 3, further comprising calculating the forgetting factor based on a dominant time constant of the plant.

5. The method of claim 1, further comprising scaling the adjusted correlation coefficient to dampen a convergence rate of the control input toward an optimum value as the correlation coefficient approaches zero.

6. The method of claim 1, wherein using the adjusted correlation coefficient to modulate the control input comprises determining a new value of the control input based on a previous value of the control input, the adjusted correlation coefficient, and a controller gain value.

7. The method of claim 1, further comprising selecting an extremum of the plurality of values of the correlation coefficient as the second value of the correlation coefficient.

8. The method of claim 1, further comprising adjusting the second value of the correlation coefficient by causing the second value of the correlation coefficient to decay toward zero over time.

9. The method of claim 1, wherein the correlation coefficient comprises at least one of a gradient of the performance variable with respect to the control input or a normalized indication of the gradient.

10. An extremum-seeking controller comprising a processing circuit configured to:
    determine a plurality of values of a gradient that relates a control input provided as an input to a plant to a performance variable that characterizes a performance of the plant in response to the control input, the performance variable comprising a noise-free portion and an amount of noise;
    determine an adjusted gradient by scaling a first value of the gradient selected from the plurality of values relative to a second value of the gradient selected from the plurality of values, the adjusted gradient relating the noise-free portion of the performance variable to the control input;
    scale the adjusted gradient to dampen a convergence rate of the control input toward an optimum value as the gradient approaches zero; and
    operate equipment of the plant by using the adjusted gradient to modulate the control input provided as an input to the equipment of the plant.

11. The extremum-seeking controller of claim 10, wherein the processing circuit is configured to determine the first value of the gradient based on a covariance of the control input and the performance variable, a variable of the control input, and a variance of the performance variable.

12. The extremum-seeking controller of claim 10, wherein the second value of the gradient is determined based on a first filtered value of the plurality of values of the gradient and a forgetting factor.

13. The extremum-seeking controller of claim 12, wherein the processing circuit is further configured to calculate the forgetting factor based on a dominant time constant of the plant.

14. The extremum-seeking controller of claim 10, wherein the processing circuit is further configured to adjust the second value of the gradient by causing the second value of the gradient to decay toward zero over time.

15. The extremum-seeking controller of claim 10, wherein the processing circuit is configured to select an extremum of the plurality of values of the gradient as the second value of the gradient.

16. A controller comprising a processing circuit configured to:
- determine a plurality of values of a correlation coefficient that relates a control input provided as an input to a plant to a performance variable that characterizes a performance of the plant in response to the control input, the performance variable comprising a noise-free portion and an amount of noise;
- determine an adjusted correlation coefficient by scaling a first value of the correlation coefficient selected from the plurality of values relative to a second value of the correlation coefficient selected from the plurality of values, the adjusted correlation coefficient relating the noise-free portion of the performance variable to the control input, wherein the first value of the correlation coefficient is a maximum value of the plurality of values of the correlation coefficient that decays over time; and
- operate equipment of the plant by using the adjusted correlation coefficient to modulate the control input provided as an input to the equipment of the plant.

17. The controller of claim 16, wherein the plurality of values of the correlation coefficient are filtered values of the correlation coefficient.

* * * * *